(12) United States Patent
Fisher et al.

(10) Patent No.: US 10,425,254 B2
(45) Date of Patent: *Sep. 24, 2019

(54) MODULAR DEVICE AND DATA MANAGEMENT SYSTEM AND GATEWAY FOR A COMMUNICATIONS NETWORK

(71) Applicant: eyeCAM, LLC, San Francisco, CA (US)

(72) Inventors: Ronald Eugene Fisher, San Francisco, CA (US); Bryan Jonathan Davis, San Francisco, CA (US); Mark Joseph Meyer, San Francisco, CA (US); Bradley Brian Bushard, Chaska, CA (US); Nitin Patil, San Ramon, CA (US); James Fisher, San Francisco, CA (US)

(73) Assignee: EYECAM, LLC, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/597,169

(22) Filed: May 17, 2017

(65) Prior Publication Data
US 2017/0257229 A1  Sep. 7, 2017

Related U.S. Application Data

(63) Continuation of application No. 14/940,131, filed on Nov. 12, 2015, now Pat. No. 9,660,837, which is a
(Continued)

(51) Int. Cl.
*H04L 12/66* (2006.01)
*H04L 12/24* (2006.01)
(Continued)

(52) U.S. Cl.
CPC .......... *H04L 12/66* (2013.01); *H04L 12/6418* (2013.01); *H04L 41/0809* (2013.01);
(Continued)

(58) Field of Classification Search
CPC ..... H04L 12/24; H04L 12/28; H04L 12/2809; H04L 12/2814; H04L 12/40117;
(Continued)

(56) References Cited

U.S. PATENT DOCUMENTS 6,779,027 B1 *  8/2004  Schunicht ............... H04L 41/00 370/254
8,572,677 B2 * 10/2013  Bartholomay ...... H04L 63/0227 726/1

(Continued)

*Primary Examiner* — Tri H Phan
(74) *Attorney, Agent, or Firm* — Franklin & Associates International Inc; Matthew Lambrinos

(57) ABSTRACT

A gateway provides duplex-directional, multimedia ad hoc mesh networking, peer-to-peer direct communications, power optimization, dynamic configuration, and data management, while operating within various devices and network topologies. A multitasking virtual machine monitor for mobile networked devices, that is capable of functional expandability and portability to various operating environments, interoperability with a variety of operating systems, the Gateway Control System (GCS) performs functional capabilities in both a local and a networked topology using local and remote hardware and software. Software within the GCS is partitioned into sequentially, autonomous code, referred to herein as "modules," each module being configured to communicate with hardware and other gateway modules. Collectively, all gateway modules are referred to herein as the gateway stack (GS). Each member of the GS can be turned on or off, downloaded from a remote site, and dynamically configured.

21 Claims, 28 Drawing Sheets

Related U.S. Application Data continuation of application No. 14/217,409, filed on Mar. 17, 2014, now Pat. No. 9,219,647.

(60) Provisional application No. 61/852,156, filed on Mar. 15, 2013.

(51) Int. Cl.

| | | |
|---|---|---|
| *H04L 12/64* | (2006.01) | |
| *H04L 29/06* | (2006.01) | |
| *H04L 29/08* | (2006.01) | |
| *H04W 84/18* | (2009.01) | |

(52) U.S. Cl.
CPC .......... *H04L 63/0281* (2013.01); *H04L 63/04* (2013.01); *H04L 67/1095* (2013.01); *H04W 84/18* (2013.01)

(58) Field of Classification Search
CPC ..... H04L 12/64; H04L 12/6418; H04L 12/66; H04L 29/06; H04L 29/08; H04L 41/0809; H04L 63/00; H04L 63/0281; H04L 63/04; H04L 63/20; H04L 65/40; H04L 65/1013; H04L 67/025; H04L 67/1095; H04L 67/2819; H04L 69/32; H04L 2012/2841; H04L 2012/5618; H04L 2209/60; H04W 4/00; H04W 84/18; H04W 88/16; G06F 15/177; G06F 2009/45595; H04B 7/00; H04B 2203/545; H04B 2203/5437; H04B 2203/5441; H04N 21/43615; H04M 7/0069; H04M 7/125; H04M 7/1225; H04M 11/007; H04Q 2213/13196
See application file for complete search history.

(56) References Cited

U.S. PATENT DOCUMENTS

| | | | | |
|---|---|---|---|---|
| 9,219,647 | B2* | 12/2015 | Fisher | H04L 41/0809 |
| 9,660,837 | B2* | 5/2017 | Fisher | H04L 41/0809 |
| 2005/0005167 | A1* | 1/2005 | Kelly | H04L 41/28 |
| | | | | 726/4 |
| 2005/0021860 | A1* | 1/2005 | Kelly | H04L 12/4625 |
| | | | | 709/246 |
| 2012/0203877 | A1* | 8/2012 | Bartholomay | H04L 63/0227 |
| | | | | 709/221 |
| 2013/0145375 | A1* | 6/2013 | Kang | G06F 21/53 |
| | | | | 718/104 |
| 2016/0378538 | A1* | 12/2016 | Kang | G06F 21/53 |
| | | | | 718/1 |
| 2018/0246760 | A1* | 8/2018 | Kang | G06F 21/53 |

* cited by examiner

MODULAR DEVICE AND DATA MANAGEMENT SYSTEM AND GATEWAY FOR A COMMUNICATIONS NETWORK

CROSS REFERENCE TO RELATED APPLICATIONS

This application is a continuation of U.S. non-provisional application Ser. No. 14/940,131, filed Nov. 12 2015, which is a continuation of U.S. non-provisional application Ser. No. 14/217,409, filed Mar. 17, 2014, which claims the benefit of U.S. provisional patent application Ser. No. 61/852,156 filed 15 Mar. 2013. Each patent application identified above is incorporated herein by reference in its entirety to provide continuity of disclosure.

BACKGROUND OF THE INVENTION

Technical Field

The invention relates to a communications network. More particularly, the invention relates to a modular device and data management system, and a gateway for a communications network.

Description of the Background Art

When wireless/cellular phone technology was initially commercialized, cellular phones were simple transmitter/receiver devices, i.e. such devices had no networking capabilities outside of their cellular carrier network and were limited to voice-only communications and SMS text messaging. These cellular phones were hand-held devices, a hands-free option was introduced that required plugging in a wired headphone connection between the phone and an earpiece and microphone. Over time, some new technologies evolved.

Most notably:

Bluetooth Communication Protocol is an open wireless technology for short-range wireless communications with a maximum range of 100 to 200 feet and that enables wireless devices to communicate with each other over short distances: With the introduction of the Bluetooth communication protocol, wireless phones could communicate with other devices over a short range. This advancement in technology created a new market for wireless accessories. The very nature of the protocol eliminated the need for a wired device to establish hands-free operation and wireless peer-to-peer communications, Now, the user could use a cellular phone to communicate with an accessory (or any Bluetooth enabled device) over a personal area network, thus truly making the use of the device hands-free.

WiFi Wireless Local Area Networking set of standards based on the 802.11 2.4 GHz frequency bands with a maximum range of 350 to 800 feet with original data transfer speeds of 5 to 11 megabytes per second (mbps) and newer versions claiming 100 to 200 mbps. The WiFi protocol greatly expanded the use of the Internet by providing WiFi enabled computers and handheld devices to have easy access to the Internet via Wireless Access Points or "Hot Spots" through a router connected to a wired Cable or DSL link to an Internet Service Provider. This made it possible for local coffee shops, bookstores, and businesses to provide free or low cost wireless access to the Internet to anyone with a WiFi enabled device.

Digital Video Cameras and Audio-Video Streaming: With the advent of digital imaging cameras capable of capturing and storing images and videos in a digital format, the next step in the evolution of the video cameras was their ability to stream the video over wireless networks.

What these devices have in common is a dependency either on another more powerful computing and/or communications device or on the Internet for uploading and sharing data and one-way streaming of captured audio-video feed. Recently, a hands-free wireless video camera telecommunications headset has been invented that represents a new generation of entirely autonomous wearable two-way and multi-feed hands-free wireless communications devices capable of sending and receiving voice, data, and audio-video without the need for a paired external, handheld, wired or wireless computing, networking, or storage device (see U.S. patent application Ser. No. 12/714,693, filed 1 Mar. 2010, which application is incorporated herein in its entirety by this reference thereto).

The hands-free wireless video camera telecommunications headset provides voice, data and audio-video streaming to and from a hands-free wireless mobile device. Further, it provides multiple embodiments of a video camera telecommunications headset with a retractable viewfinder/monocular display and a laser rangefinder offered as either a single unit hands-free wireless real-time bi-directional and multi-feed telecommunications headset or as a modular Bluetooth earpiece headphone (Headphone) unit with a detachable handheld cellular video camera unit, with the earpiece unit serving as either a stand-alone wireless Bluetooth Headphone and personal media player or as a wearable multimedia port for the detachable handheld cellular video camera telephone unit that when linked together operate as a single autonomous hands-free wireless video communications headset capable of still image and audio-video capturing, recording and streaming to and from a receiver or group of receivers and real-time viewing and control of captured and/or received audio-video feeds via the retractable monocular viewfinder or other paired multimedia display system.

Further, such device includes headset accessories including an adjustable docking station for recharging and/or use of the headset as a stationary wired or wireless IP camera, removable/rechargeable earpiece and neckpiece battery units for continuous hands-free wireless mobile headset, headphone and/or other ported device operations and a pair of multimedia sunglasses for active binocular display and eye to camera automation of the headsets optical and digital zoom, day and night vision camera.

Stemming from a need for a ubiquitous peer-to-peer direct networking platform for the telecommunications headset capable of pairing the headset with any existing Wide, Metro or Local, and Personal Area Networked device or group of devices; and supporting real-time multi-feed, multi-channel bi-directional video streaming, mesh networking, and coordinated device operations, including a remote view finder, camera zoom and remote systems control, it became apparent that such a platform did not exist.

Due to an ever increasing number of Bluetooth and WiFi enabled electronic devices, such as digital cameras, media players, and portable video game players, and a myriad of smart phones that operate on increasingly intelligent and incompatible mobile operating systems that are developed by competing technology companies and that are often sold exclusively through individual carrier networks that use proprietary radio frequencies and that are capable of supporting widely varying bandwidth speeds, there is a need for a ubiquitous scalable platform that is capable of installation and operation on, and in coordination with, a diversity of devices networks and operating systems.

Equally apparent was the need for a secure, device-based Mobile Ad-hoc Direct Peer-to-peer Communications Network where each networked device or node acts as an independent router, transmitter, and receiver and connects directly to another device or group of devices without the need for a wired or wireless access point, Wireless Carrier Network, or Internet Service Provider.

SUMMARY OF THE INVENTION

The herein disclosed gateway device and data management and networking system preferably comprises a hypervisor, a virtual machine monitor for wireless networked devices, and a ubiquitous scalable platform for mobile ad-hoc mesh networking, dynamic network configuration and secure data transfer, channeling, and communications over any wired or wireless network.

An embodiment of the invention comprises a gateway that encompasses such capability as, for example, bi-directional multimedia networking, power optimization, dynamic configuration, communications, and data management, while operating within various devices, operating systems, and network topologies. An embodiment is configured to run in an embedded system, as a downloadable platform and/or as a networked application. A presently preferred embodiment of the invention thus comprises a multitasking device, data, and network management system capable of functional expandability and portability to various operating environments.

Functionality provided by an exemplary embodiment of the invention comprises, for example:

- Bi-directional and multi-feed voice, data, and audio-video communications over a direct peer-to-peer wireless mesh network;
- A ubiquitous virtual machine monitor capable of configuration and interoperability with a variety of mobile device operating systems;
- A modular device management system and ad hoc networking platform scalable for a wide range of networked devices;
- A platform for grouped device intelligence, coordinated task management and data, power, and network optimization;
- Dynamic mesh communications, and real-time coordination of unified, federated, managed, and scalable network configurations;
- Dynamic and secure data channeling over multiple wireless protocols and networks;
- Complete system-wide capability-based security settings;
- Complete systems automation for hands-free wireless and remote device operations, remote view finder, and remote systems control; and
- Dynamic hardware and software configurability.

Functional capabilities within the herein disclosed gateway are performed in both a local and a networked topology using local and remote hardware and software. Software within an embodiment of the gateway is partitioned into sequentially, autonomous code, referred to herein as "modules," each module being configured to communicate with hardware and other gateway modules. Collectively a set of device modules are referred to herein as the Device Module stack (DMS). When a group of Gateway Devices collaborate they form a single Gateway Module Stack (GMS) that is reflected by each of the networked Gateway Devices. Depending on the security settings set by the user, user group and/or managed network each module in a DMS and each DMS in a GMS can be turned on or off, disconnected or dynamically re-configured by an authorized user or network manager.

DETAILED DESCRIPTION OF THE INVENTION

Figure 1:
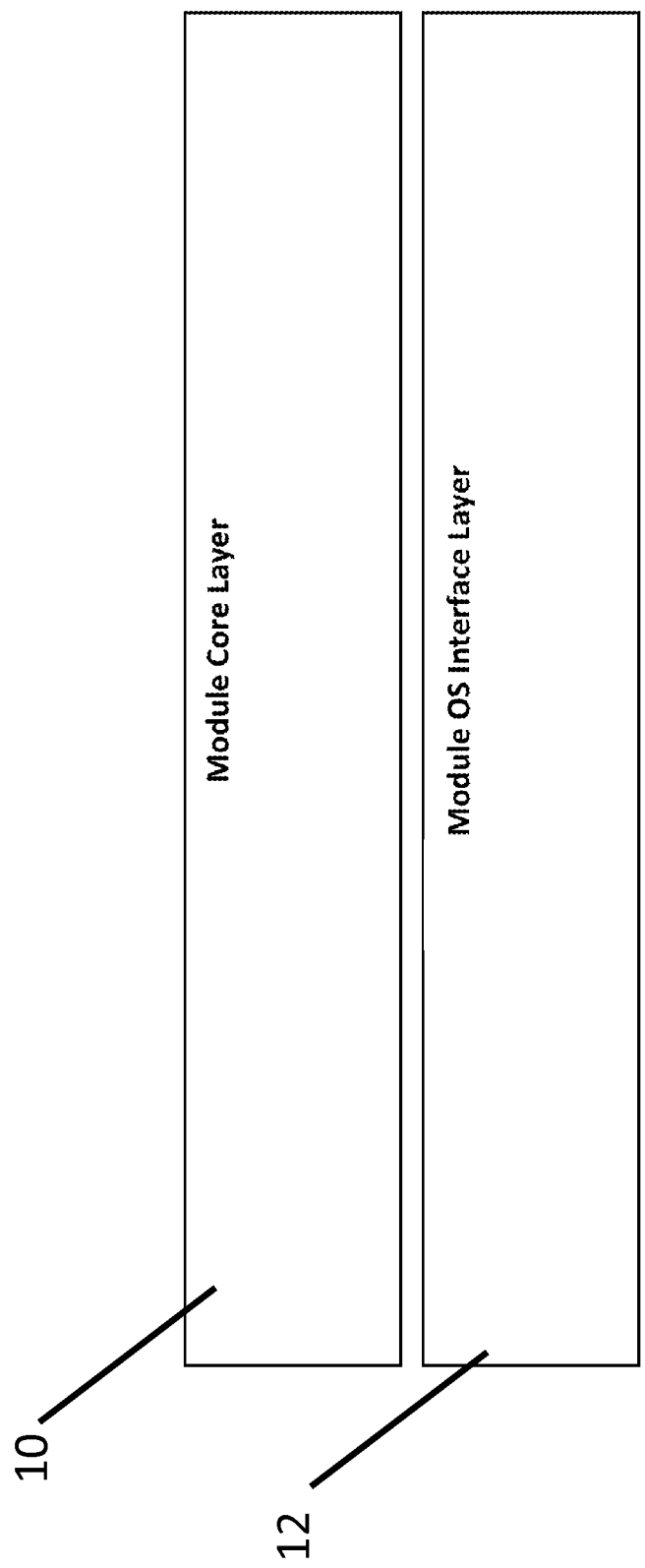
FIG. 1 is a block schematic diagram showing gateway layers according to the invention.

An embodiment of the invention comprises a gateway modular device and data management system that encompasses such capability as, for example, duplex-directional multimedia networking, power optimization, dynamic configuration, communications, and data management, while operating within a variety of devices and network topologies. The gateway serves as a functional model for device automation, modular system and data management, data channeling, paired, grouped and/or networked device optimization, and hands-free and remote systems control, Although technically an operating system, the gateway may be more accurately defined as a device, data and network optimization and control system, A presently preferred embodiment of the Gateway Control System (GCS) comprises a virtual machine monitor that is configured to run in an embedded system as a downloadable program or as a networked application. A preferred embodiment of the invention comprises a multitasking control system that is capable of functional expandability, portability to various operating environments, and interoperability with existing operating systems.

Gateway Control System

Functional capabilities within the herein disclosed gateway are performed in both a local and a networked topology using local and remote hardware and software. Software within an embodiment of the gateway is partitioned into sequentially, autonomous code, referred to herein as "modules," each module being configured to communicate with hardware and other gateway modules. Collectively, all gateway modules are referred to herein as the gateway stack (GS). Each member of the GS can be turned on or off, downloaded from a remote site, and dynamically configured.

Modular Device Management

In the Gateway control system, device optimization is managed in an intelligent semi-autonomous modular architecture with each module selecting the most effective method for accomplishing each task based on user configurations for power, data, device, network, security, and communications. Different sets of systems and tasks, such as power management, data management, voice command and communications, Audio-Video Systems, and Geographic and Contextual Systems, and all related hardware, programs and components are organized into standard, virtual modular management systems.

Targeted environments for a presently preferred embodiment of the gateway are primarily focused within five areas:

1. System: The gateway Control System (GCS) has its foundation based on the portability provided by the open sourced Linux Operating System and a number of Real-Time Operating Systems (RTOS), such as VxWorks, PSOS and MTOS. Its portability is achieved by partitioning core functionality software from targeted system dependent software. Thus, the gateway has the ability to run in an embedded environment or as a downloadable image. Multitasking capability of both Linux and available RTOS's is exploited by the gateway, as is the ability to dynamically download, install, and execute new tasks, and the ability to control task execution characteristics remotely.

2. Device: Many battery powered electronic devices have a power management system limited to shutting down most components at once after a period of time to extend battery life. The gateway performs its power management functionality dynamically by constantly monitoring, managing and optimizing power use for all local and networked device systems, components and applications based on factors such as component characteristics, power use history, time since last used, priority settings, security level, network topology, and user preferences and all networking characteristics such as geography (location and distance), routing 3. Data: All data collected and managed by each module can operate as an independent channel with all modules and data coordinated with other modules and can either be grouped with other module data and sent out collectively over a single wired or wireless network or broadcast independently via a unique data channel over multiple available networks. Using this model, a cellular only Gateway device can communicate with a WiFi only device by mesh networking with one or more Gateway Cellular and WiFi enabled devices and/wireless routers which relay the data stream to and from the targeted user.

4. User: An authorized user, user group, and/or network manager can customize the core functionality of any Gateway enabled device, group of devices, or network by defining their use preferences for each Gateway Module and Security and Networking preferences for all related modular systems control and modular data management, access, channeling, and communications.

5. Network: The GCS combines the methods and capabilities of multiple routing protocols and network topologies for Mobile ad hoc and Mesh Networking (MANET) such as reactive and proactive (Hybrid) routing, Hierarchical Routing, Temporally-ordered Routing Algorithm (TORA), Geographical Routing (Geocasting), Power-aware and Multicast Routing, Dynamic Source Routing (DSR) and Concurrent Multi-path Routing (CMR) into one dynamic scalable, platform and peer-to-peer device network.

Gateway Peer-to-Peer Device Network

1. Grouped Device Coordination

When two or more autonomous gateway enabled devices (Gateway Devices) join or connect as a Unified, Federated, Managed, or Coordinated Group over any combination of wired and wireless protocols and network topologies the Module Stack (MS) of each of the autonomous devices expands to include the Module Stacks of the other gateway devices, thus generating a single collective Gateway Module Stack (GMS) that is mirrored by each of the grouped devices.

In a Gateway Module Stack (GMS), the individual module stacks of each device acknowledge and adopt the related components and systems of the other networked devices and groups them into a Networked Component Set. The Networked Component Set is a virtual embodiment of all remote module stacks and related components. Once a GMS has been generated, each individual device module stack then independently calculates the most efficient distribution of system priorities, tasks, and responsibilities for the collective group of devices. The device with the fastest processing speed is dynamically selected as a primary or lead device to ensure the most rapid updating and networking of data. A standard refresh rate is also selected for the GMS based on the average networking speed across all grouped devices. A new lead device is automatically selected if the primary or lead device disconnects from the group.

2. Capability-Based Security

The Gateway Control System (GCS) offers a platform for total device, systems, and network configuration. The security settings extend to every facet of device operations and systems control from the level of access a user has over device functionality and applications to limiting device communications to a group of authorized devices. A user and/or authorized network manager may also define the type of devices, groups, and or networks with which a managed device and/or user can connect, the nature, location, and/or duration of a group formation, and the types of data and method of data transfer. By pre-configuring device security and operational parameters a user, user group, and/or managed network can set up an autonomous networking system for any number and diversity of networked devices and users.

Any number of additional security systems and parameters may also be put added to the Module Stack of a single device or managed group of devices, such as a user, device, and/or network password, authorization, and/or access code, a geographic identifier, such as device location and/or orientation to another device, group of devices, and/or specified location, and any authentication mechanism, such as a voice fingerprint, iris scan, or other system and/or program based method of user, device, and/or network identification.

3. Dynamic Source Routing

The GCS serves as a dynamic source routing system that uses attributes from a number of routing protocols for Mobile ad hoc and Mesh Networking (MANET), such as reactive and proactive (Hybrid) Routing, Hierarchical Routing, Multipoint Relay, Temporally-ordered Routing Algorithm (TORA), Geographical Routing (Geocasting), Power-aware and Multicast Routing, Dynamic Source Routing (DSR), and Concurrent Multi-path Routing (CMR) into one platform.

4. Data Channeling and Communications

All data collected and managed by each module can be channeled directly from a source Gateway Device to one or more receiving devices. The data can be streamed and/or transferred via a virtual machine monitor interface link configured between one or more networked Gateway Devices. Voice, contextual, and audio-video data is channeled either as a collective gateway stack over a single wired or wireless network, or broadcasted independently via a unique module data stream over one or more available networks. Using this model, Gateway Devices using different networks can communicate by mesh networking with one or more Bridge Nodes (Gateway Devices operating as routers) which then relay the data stream securely to and from one or more networked devices.

5. Dynamic Network Configuration

When the Gateway Stacks (GS) of two or more Gateway devices recognize each other and join a collective Gateway Module Stack, the GMS coordinates the optimum group or network configuration and/or coordinated cluster of groups and network configurations based on the level of access and security settings of each networked device and the optimized network configuration for power, bandwidth, available protocols, location, and other routing parameters.

The following functional grouping and networking formats provide a platform for dynamic network formation.

Unified Group

In a Unified Group Configuration each gateway device authorizes complete module stack and related system access to another device or group of devices. When individual module stacks in each device are set to authorize, the device acknowledges and adopts the related components and systems of the other networked devices and groups them into a Networked Component set. The unified module stack then seeks out the most efficient distribution of system priorities, tasks, and responsibilities collectively for the entire group of devices.

Federated Group

Alternatively, a user or user group can join a Federated Network of Gateway devices in which all devices maintain their autonomy and simply serve as a wireless router or bridge node supporting in the optimized transfer of data and network channeling, device coordination, and optimized communications, but have no access to networked data or devices and no remote systems control because all transferred data is channeled to an authorized receiving device and is not capable of being accessed or received by any authorized receiving device with optional key or data encryption available Managed or Hierarchical Network In a Hierarchal Managed network configuration a server based Managed Gateway Network can be set up by an enterprise or agency, such as a police department, and all issued gateway enabled wireless devices can be authorized as a managed device and then either permanently assigned to a specific user or temporarily assigned to a specific user or group of users with all user, device, data, and network authorization set up via a network-based hierarchy. A set of user identification and authorization programs may be put into place with different users gaining different levels of access and control over a device, group of devices, and/or network configuration based on the user's security clearance.

Architectural Layout for the Gateway

A presently preferred embodiment of the gateway is logically thought of as partitioned into two layers (see FIG. 1), i.e. a module core layer 10 and module OS interface 11 layer, with functionality focused on:

Module core: this layer is responsible for performing high level, coordinated functionality. It makes up the core gateway software that is compiled and linked only.

Module OS interface: this layer is primarily responsible for directly allowing a module applications layer to map a module core layer I/O with a given device's resident operating system. Its intent is to be customized, compiled, and linked with the module core layer.

Module Network Interface: using the Network and Communications Module, the Network Interface is primarily responsible for device-to-device, device-to-group, and device-to-Network data, systems, and Module Core Layer interface coordination, data channeling, and systems optimization, over one or many network topologies, based on optimum efficiency and the security settings of each device and of the entire group and/or network.

Environments for the Gateway

Targeted environments for the gateway are focused within the following areas:

Hands-free wireless devices, such as the Telecommunications Headset, and other digital video cameras, media players, portable video-gaming devices, media glasses, clothing, watches, and other low power, networked electronic devices and accessories.

Cell Phones, Smart phones, and PDA's.

Tablets, PC's, Networked Televisions, and Video Gaming Systems.

Vehicle Media Systems, Dashboard consoles, Telematics, and other vehicular computing systems supporting an Ad-hoc networking platform.

Fleet Management and Transportation Systems

Home Security, Entertainment, and Command Centers

Enterprise VPN's and private security systems

Government departments, agencies, and networks such as police, fire, medical, and emergency response, state, and Federal law enforcement agencies.

Wireless Carrier Networks and Internet Service Providers
Architectural Overview

Figure 2:
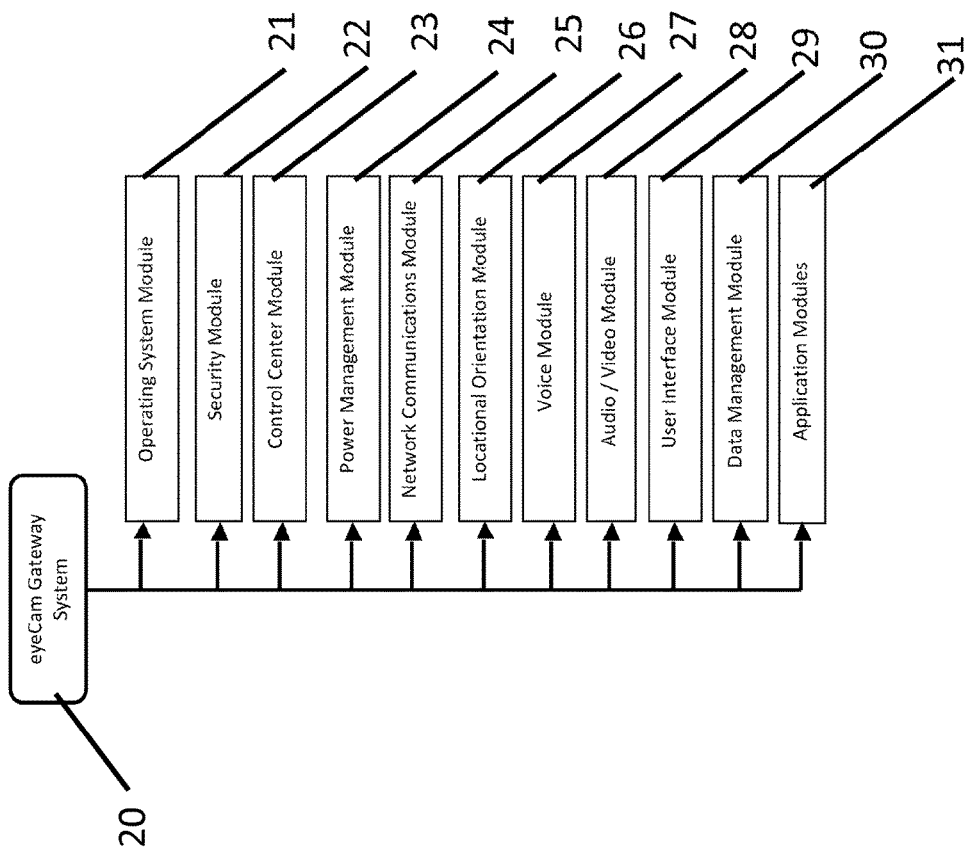
FIG. 2 is a block schematic diagram showing gateway architecture according to the invention.

The gateway is an invention encompassing duplex-directional multimedia networking, power optimization, dynamic configuration, communications and data management while operating within various devices and network topologies. A presently preferred embodiment involves the coordination and execution of twelve unique modules, known here as the gateway stack (GS) (see FIG. 2).

In total, the GS 20 provides the following functional capabilities within the three environments:

Duplex-directional Audio/Video/Data communications 25;
Simultaneous communications over wired and wireless based networks 25;
Audio capture and processing 28;
Video capture and processing 28;
Data management storage and retrieval 30;
Global Positioning System oriented functionality 26;
User Interface functionality 29;
Remote network and local access and control of both gateway and non-gateway devices 23;
Plug-and-Play capabilities 21;
Local and remote device power management 24;
Voice recognition 27;
Local and remote security 22; and
Ability to expand functionality by adding new GS modules 31.

Figure 3:
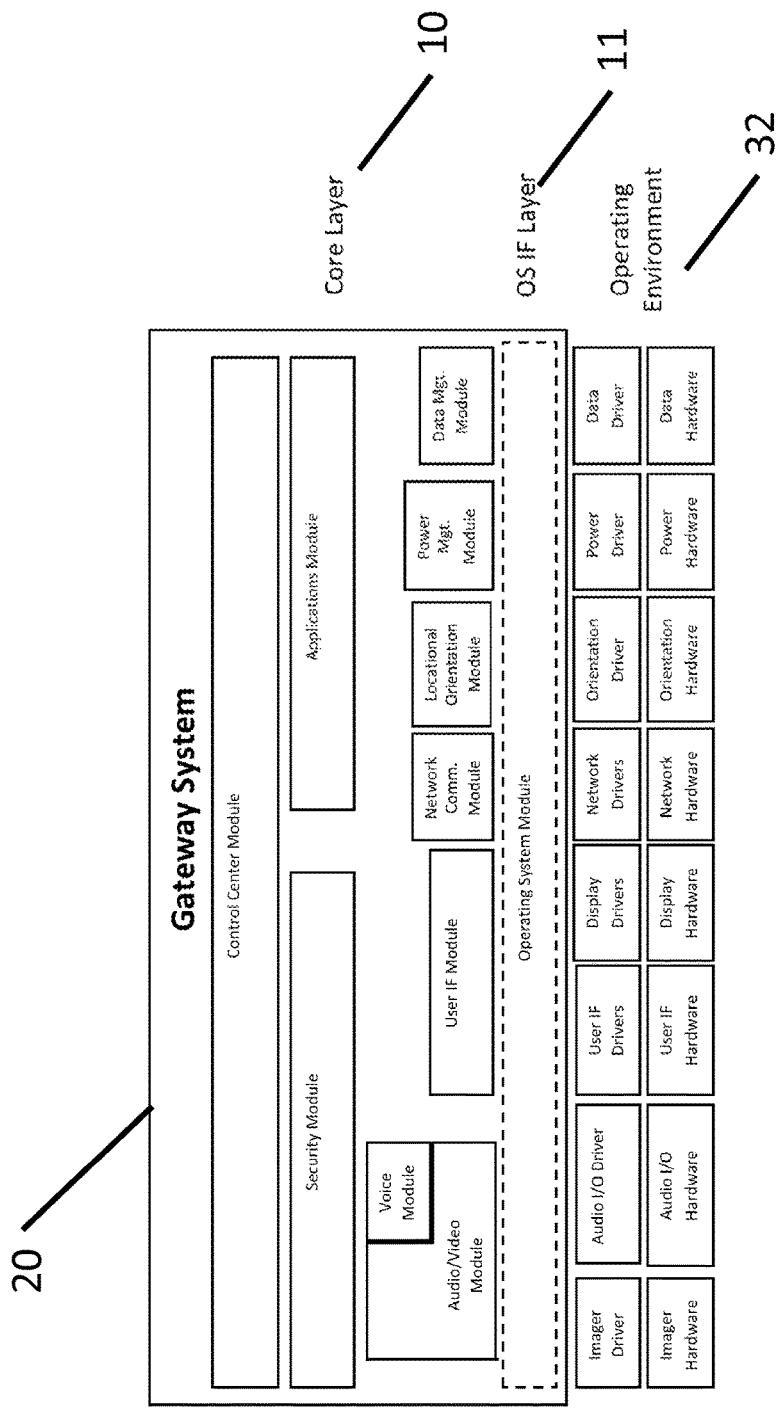
FIG. 3 is a block schematic diagram showing a gateway stack according to the invention.

To meet both the functional capabilities and portability over the three operating environments, the gateway is layered as shown in FIG. 3, i.e. the core layer 10, the operating system interface layer 11, and the operating environment 32.

Gateway Data

The gateway provides a mechanism for expanding the types and quantity of data used by GS modules. All data communicated, stored and processed uses a general format known by all GS modules. Actual data format is known by one or more GS modules.

Gateway Data Types

The gateway provides a mechanism for categorizing data. Data is associated with system inputs, module inputs and module outputs. Modules are required to know both the type and format of data being received and transmitted. See Table 1 below.

TABLE 1

Categorized Gateway Data Type List

| Data Type | Description |
| --- | --- |
| Audio | Raw or processed digitized sound waves |
| Video | Raw or processed digitized video signals |
| Talk | Processed Audio signals associated with a general conversation |
| Voice | Highly processed Audio signals associated with an individual |
| Control | Data used to specify actions or report status information |
| Orientation | GPS, geo-relational and relative positioning data |
| Contextual | Combination of two or more data types in a known relationship |

Each Data type is provided a unique identification known to one or more GS modules. This provides the gateway with the capability of expanding the data type list when new components or modules requiring unique data are added.

Gateway Data Record

To address the variability associated with run-time data processed by GS modules, data is processed as a record and formatted as shown in Table 2 below

TABLE 2

Categorized Gateway Data Type List

| Data Fields | Description |
| --- | --- |
| Data Type | Type of data in record |
| Data Length | Current length of data |
| Actual Data | Data |

Gateway Channel Communications

Channels provide the mechanism for all GS modules to communicate data and control information.

Gateway Modules

Operating System Module

Figure 4:
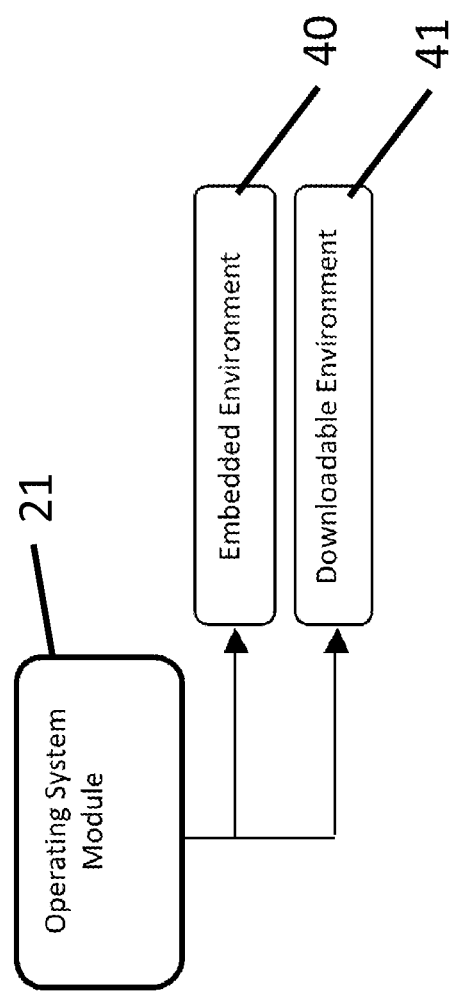
FIG. 4 is a block schematic diagram showing an operating system module according to the invention.
Figure 5:
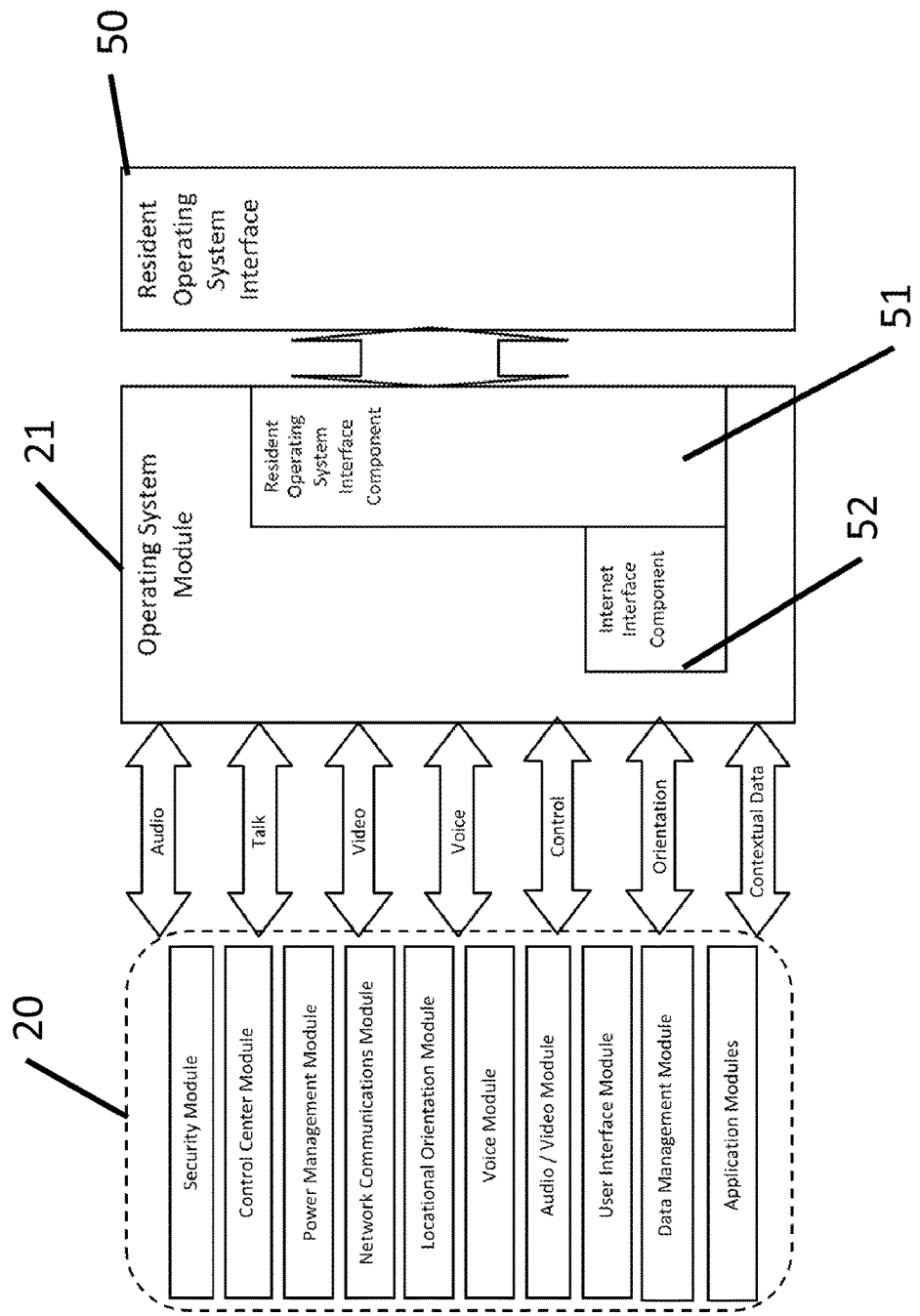
FIG. 5 is a block dataflow diagram showing an operating system module process according to the invention.

As shown in FIG. 4, an embodiment of the operating system module 21 is configured to run in an embedded system 40 and/or as a downloadable image 41. The operating system module (OSM) (see FIG. 5) provides the gateway with support and access to the resident operating system 50. The OSM has services 51, 52 that map the gateway hardware needs to appropriate resident operating system control and service routines.

Operating System Module Process

Power-Up Sequence for Gateway Operating System Module
  Scan for all local data storage hardware using resident OS if services and respond to data management module's request for local fixed and removable data storage components;
  Scan for all local user input and display hardware using resident OS if services and respond to user interface module's request for local user input and display hardware components;
  Scan for all local imager and audio I/O hardware using resident OS if services and respond to audio video modules' request for local audio and video system components;
  Scan for all local orientation hardware using resident OS if services and respond to locational orientation modules' request for local locational orientation hardware and system components;
  Scan for all local network hardware using resident OS if services and respond to network communications modules' request for local network communications components;
  Scan for all local power hardware using resident OS if services and respond to power management modules' request for local power components; and
  Wait until the security module has allowed continued processing.

Continuous Operating System Processing Sequence
  Resident OS if services for local fixed and removable data storage components include:
    Continuously monitor for changes to local data storage hardware using resident OS if services and respond to data management module's request for local fixed and removable data storage components; and
    Continuously monitor and process service requests to local data storage hardware using resident OS if services and respond to data management module's request for local fixed and removable data storage components.

Resident OS if services for local user input and display hardware components include:
  Continuously monitor for changes to local user input and display hardware using resident OS if services and respond to user interface module's request for local user input and display hardware components; and
  Continuously monitor and process service requests to local user input and display hardware using resident OS if services and respond to user interface module's request for local user input and display hardware components.
Resident OS if services for local audio and video system components include:
  Continuously monitor for changes to local imager and audio i/o hardware using resident OS if services and respond to audio video modules' request for local audio and video system components; and
  Continuously monitor and process service requests to local imager and audio I/O hardware using resident OS if services and respond to audio video modules' request for local audio and video system components.
Resident OS if services for local locational orientation hardware and system components include:
  Continuously monitor for changes to local orientation hardware using resident OS if services and respond to locational orientation modules' request for local locational orientation hardware and system components; and
  Continuously monitor and process service requests to local orientation hardware using resident OS if services and respond to locational orientation modules' request for local locational orientation hardware and system components.
Resident OS if services for local network communications components include:
  Continuously monitor for changes to local network hardware using resident OS if services and respond to network communications modules' request for local network communications components; and
  Continuously monitor and process service requests to local network hardware using resident OS if services and respond to network communications modules' request for local network communications components.
Resident OS if services for local power components include:
  Continuously monitor for changes to local power hardware using resident OS if services and respond to power management modules' request for local power components; and
  Continuously monitor and process service requests to local power hardware using resident OS if services and respond to power management modules' request for local power components.

Security Module Description

Figure 6:
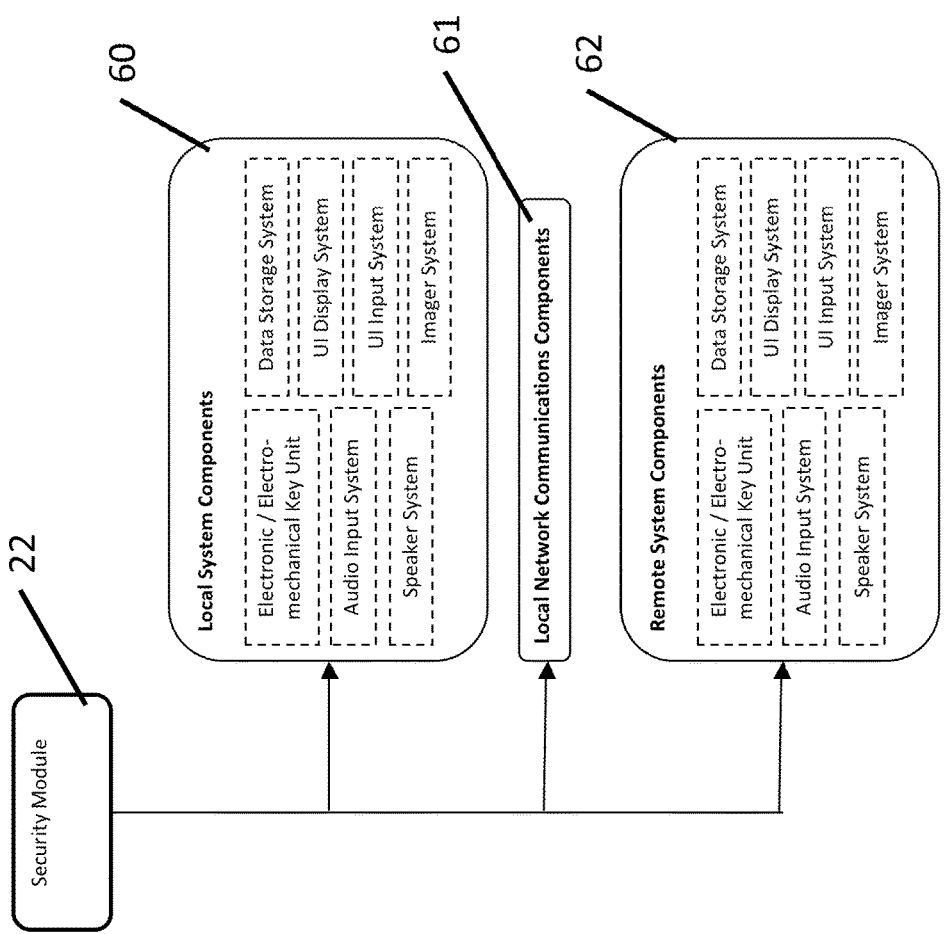
FIG. 6 is a block schematic diagram showing a security module according to the invention.
Figure 7:
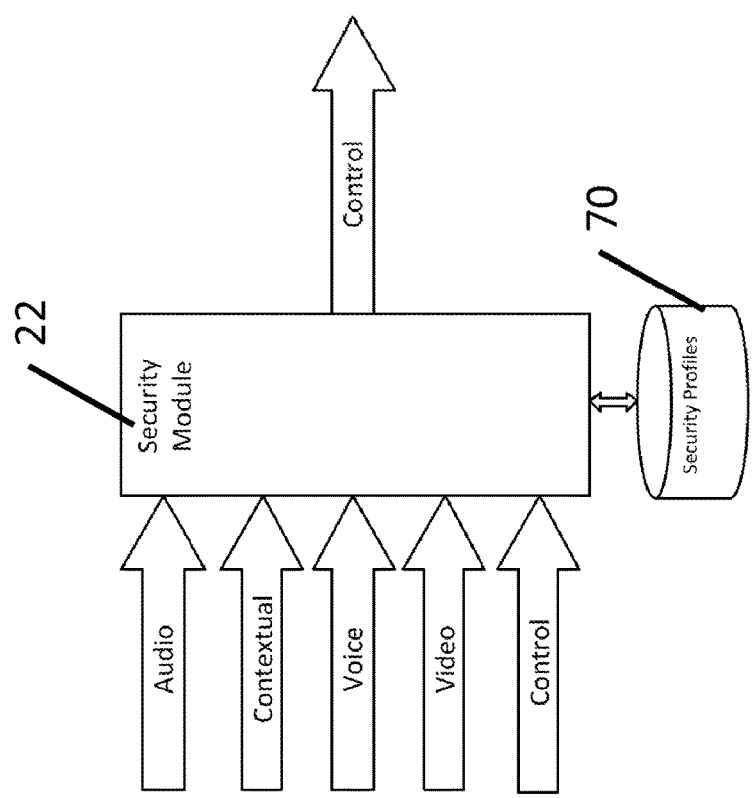
FIG. 7 is a block dataflow diagram showing a detailed security module description according to the invention.

For the following discussion, refer to FIGS. 6 and 7 and Table 3 below.

TABLE 3

| Security Profile | |
| --- | --- |
| Element | Description |
| Security Profile ID | Id of gateway device |
| Security Pattern | Pattern used for verification purposes |
| Security Level | Granted Security Level |
| Security Pattern Type | Voice, Video, Audio, Control, Contextual |
| Security Type | User, Device, Network |
| Weighted Value | Weighted valued used in security process |
| Request Type | Power-up/Event |

The security module (SM) 22, using a combination of hardware and software, provides controlled and secure access to local system components 60, local network communications components 61, and remote system components 62. Secure access revolves around gaining entry to a gateway. Controlled access defines the scope of gateway functionality available.

Three types of gateway security are processed and maintained: user, device, and network.

User type security is associated with granting access by a person, initiated by a login procedure, to a local or remote gateway and assigning access privileges.

Device type security involves access of another gateway or electronic component.

Network type security involves gateway groups and comprises loosely and tightly coupled, depending on the type of group topology. Tightly coupled security comprises full merging of gateway module stack functionality and is associated with paired and cluster network groups. Loosely coupled is associated with limited interplay of gateway module stacks and managed, federation, hierarchical, Federation$_2$ and network topologies.

All types of security requests, both incoming and outgoing, are stored and accessed by the SM.

Tightly coupled control includes standalone, paired, and clustered gateway topologies. Loosely coupled control includes managed, federation, hierarchical and Federation$_2$ topologies. As discussed above, by continuously monitoring the gateway, three categories of access are maintained: user, device, and network. As these users, devices and networks switch between online and offline modes, security profiles 70 (FIG. 7) are maintained for each, describing the level and breadth of access granted, along with information necessary for validation. These security profiles are stored, both locally and remotely and used at the time of request for granting of access.

During the validation process, the security module, as specified in a security profile, lists what local or remote system components are needed and the data pattern, relative to those system components, that are used to validate an access request. The data patterns used can be of any type of digital signal electronically readable by a computerized system: voice, sound pattern, electronic, eye pattern, fingerprint, and alphanumeric keypad input.

Factor in Managed Security
Security Module Process
Power-Up Sequence for Gateway Security Module
  Scan for all local system components physically within the gateway;
  Scan for available local network communications components; and
  Scan for and process any outgoing network access requests available on any local data storage components.

Continuous Input Access Request Processing Sequence
  Continuously monitor for incoming access requests to gateway:
    Continuously monitor for user security requests, involving a combination of user interface module input components; video, audio, voice signals; network communications components; and electronic and electro-mechanical components:
      User interface module input components include keypad, mouse, joystick; processing involves comparison of security profile pattern to component input, including alpha-numeric value and position location;
      Video, audio, voice signal inputs, including eye scans, voice recognition, and tone detection;
      Network communications components involve reception of the security profile; and
      Electronic and electro-mechanical component inputs, including digitized signal.
    Continuously monitor for device security requests, involving a combination of network communications messages; electronic or electro-mechanical components:
      Network communications components involves reception of the security profile; and
      Electronic and electro-mechanical component inputs, including digitized signal.
    Continuously monitor for network security requests, involving network communications components:
      Network communications components involves reception of the security profile.
  Continuously process any incoming access requests by a comparing the incoming request in combination with data storage resident security profiles involving security pattern type, security pattern, weighted level, and security type:
    If available, respond with rejection if unaccepted; and
    If available, respond with acceptance if accepted.
  Continuously monitor for any changes to availability of local and remote system components, both within the gateway and within a paired or clustered gateway group:
    User interface module input components include keypad, mouse, and joystick;
    Video, audio, and voice signal inputs;
    Local network communications components; and
    Data storage components.
  Continuously monitor and store on data storage components any new and updated security profiles using local and remote user interface module components and local network communications components.
  Process and store input representation on local data storage component newly created security profile input representation base on component profile's characteristics.
Continuous Output Access Request Processing Sequence
  Continuously monitor for any new and updated security profiles on data storage components requesting access to standalone, paired, clustered, managed, federation, hierarchical, Federation₂ and network topologies.
  Continuously process and transmit using local network communications components any new and updated security profiles.
  Continuously monitor and process response to output access request using local network communications components:
    If accepted, then continue; and
    If not accepted, then stop.

TABLE 3a

| | Module Profile |
| | Module Profile |
| Element | Description |
| --- | --- |
| Module Profile ID | Id of specific applications module |
| Module Status | On/Off |
| Starting Location | Entry point of application module |
| Local/Remote | Local - directly accessible |
| | Remote - Accessible via a Local Network System |
| Priority Level | 1 - Lowest Priority → x -Higher Priority |
| Data Types Used | Voice, Talk, Audio, Video, Locational, Contextual and Control data |
| Activation type | Cyclic, Event, Both |
| Cycle Time | How often to start the module |

Figure 8:
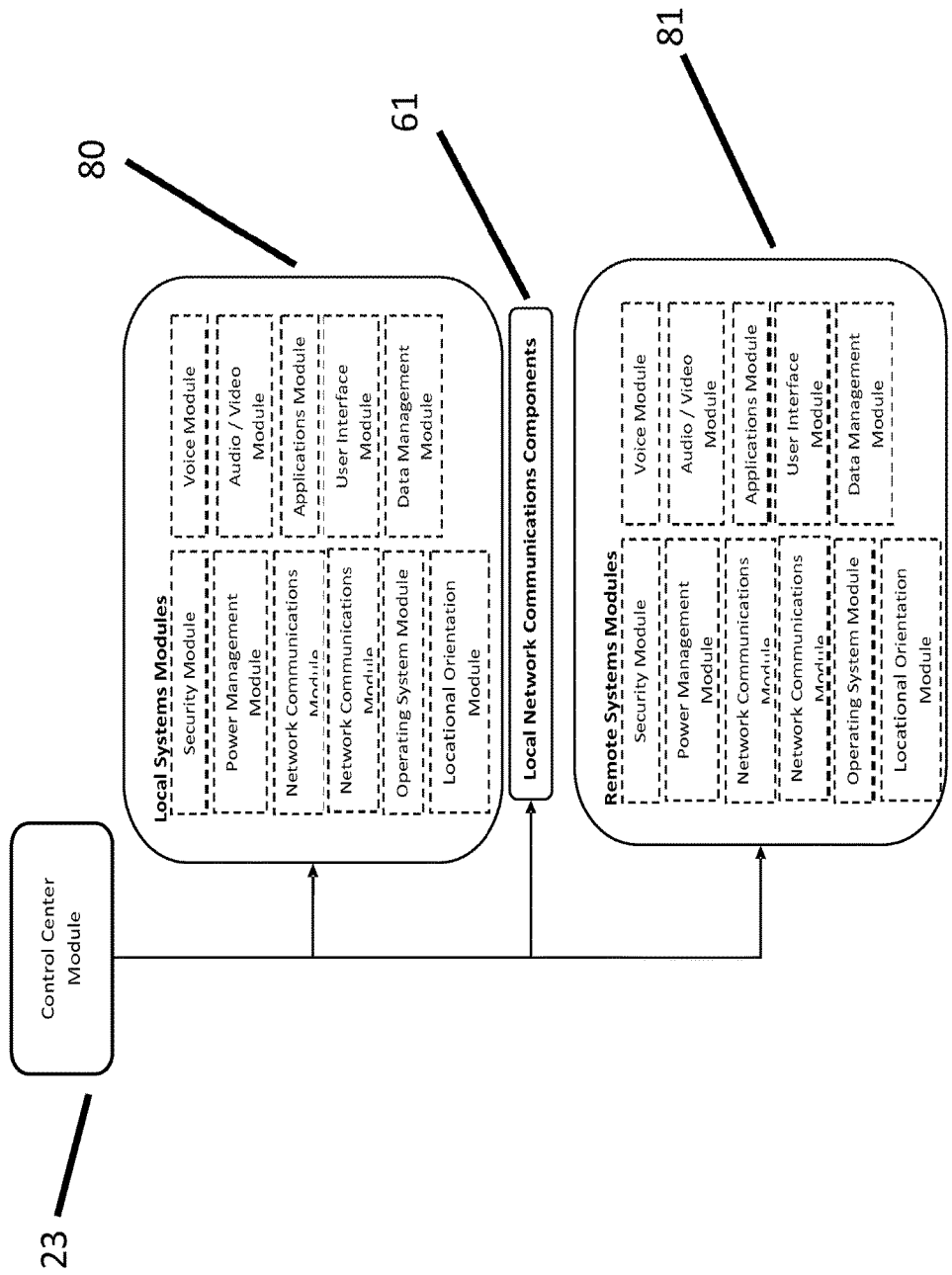
FIG. 8 is a block schematic diagram showing control center module according to the invention.
Figure 9:
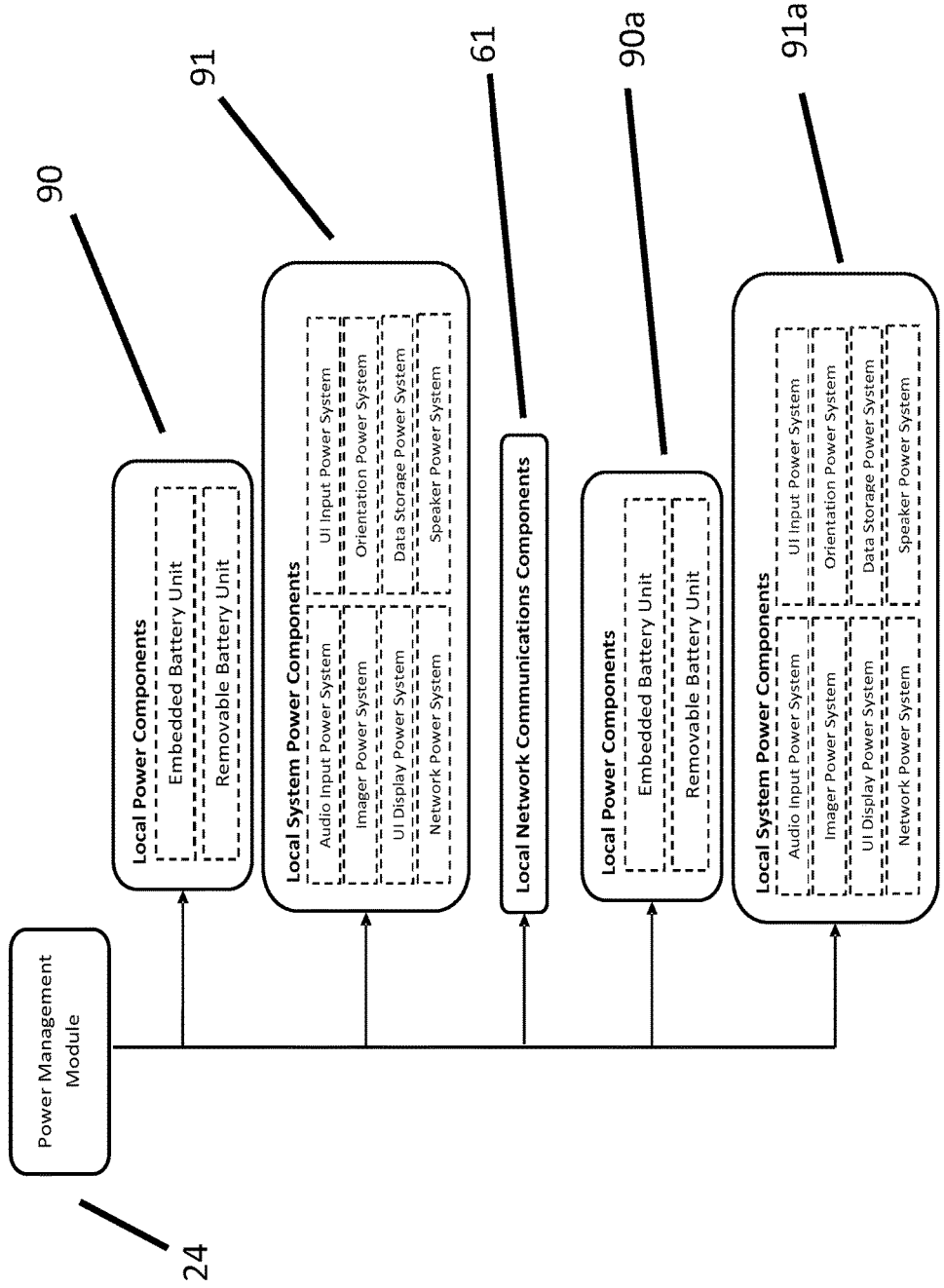
FIG. 9 is a block schematic diagram showing power management module according to the invention.

The Control Center Module (CCM) 23 (see FIG. 8), using a combination of hardware and software, provides for the activation and control of all local and remote (61) GCS modules. By monitoring the availability and unique characteristics of all local (80) and remote (81) modules, the CCM will grant execution based on each modules status, priority and activation type.

Figure 27:
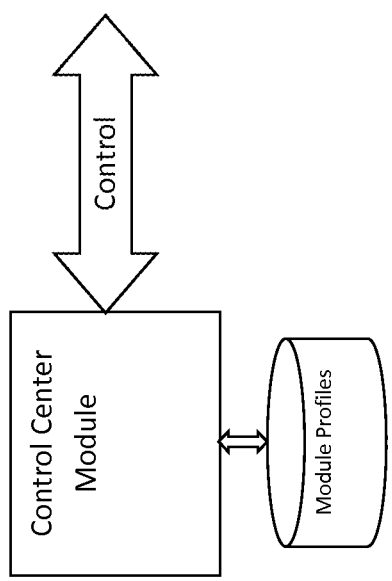
FIG. 27 is a block schematic diagram showing control center module according to the invention.

Control Center Module Process
Power-Up Sequence for GCS Control Center Module
  Scan for all Local Module Profiles (see FIG. 27) within the GCS
  Scan for all Local Storage Profiles available on any Local Data Storage Components.
  Scan for available Local Network Communications Components
  Wait until the eyeCam Security Module has allowed continued processing
Continuous Control Center Processing Sequence
  Continuously monitor for entering a Paired and Clustered Group topology and transmit using Local Network Communications Components stored on Data Storage components all Module Profiles to other group members.
    Continuously monitor SM access privileges associated with request
  Continuously monitor for and process new and updated incoming Module Profiles from Standalone, Paired, Cluster, Managed, Federation, Hierarchical, Federation₂ and Network Groups using Local Network Communications Components or Contextual Data and storing on Data Storage Components.
    Continuously monitor SM access privileges associated with request
  Continuously monitor for and queue by Priority Level for activate all Local and Remote Modules with Activation types of Cyclic and Both that their Cycle Timer has expired.
  Continuously monitor for and queue by Priority Level for activate all Local and Remote Modules with Activation type of Event that have Channels with the specified Destination ID.
  Continuously monitor for and queue Channels with the specified Destination ID to all Local and Remote Modules with Activation types of Cyclic and Both not currently active.
Power Management Module
  The power management module (PMM) 24, using a combination of hardware and software, provides controlled and functional optimization of power usage for maximum battery life. By continuously monitoring and coordinating control of electronic and electro-mechanical component usage, both locally and remotely, the PMM optimizes gateway power usage based on current needs, resulting in improved power consumption and battery life.

Figure 10:
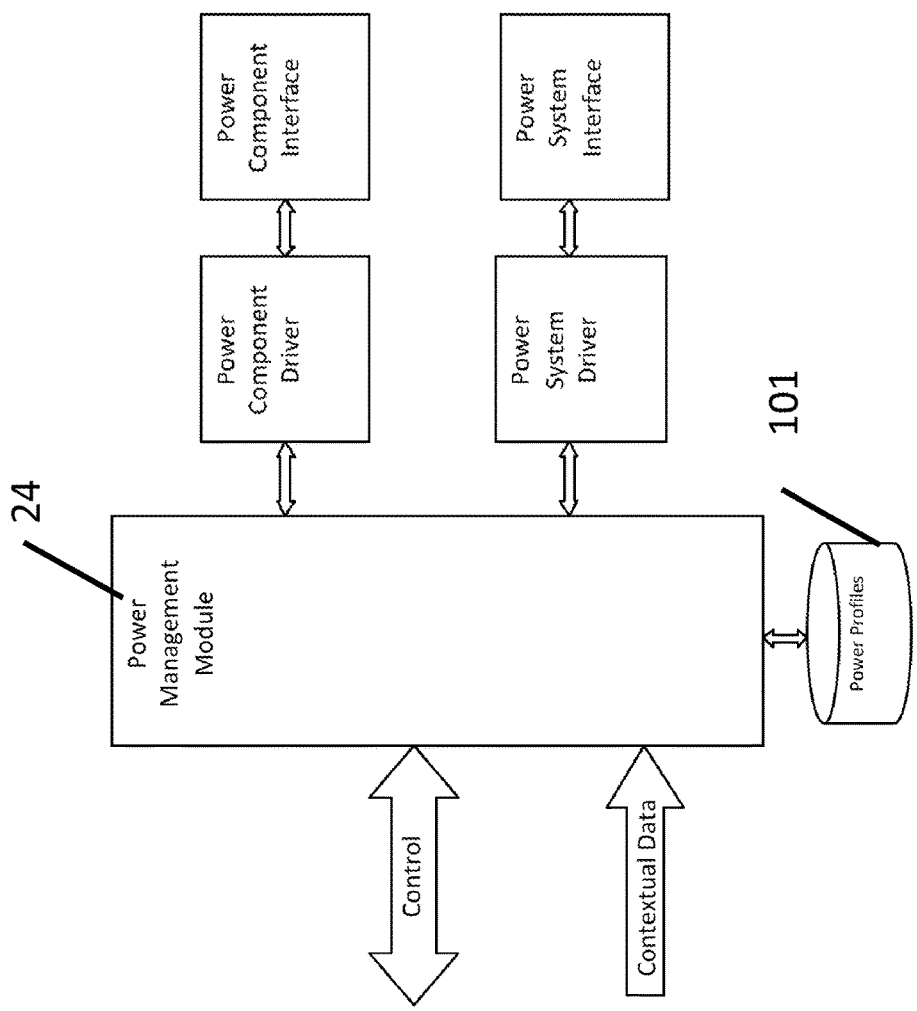
FIG. 10 is a block dataflow diagram showing a power management module process according to the invention.

The PMM continuously monitors the availability of all accessible local and remote electronic and electro-mechanical components. These components are grouped by the PMM into power sources 90/90a and power sinks 91/91a. Power sources, as defined by the PMM, provide power to the gateway. Power sinks require power. Each accessible component has a power profile 101 (see FIG. 10 and Table 4, below) defined and maintained by the PMM for use in overall system coordination and control of power use. Information contained within the power profile is used by the PMM include whether the module is a power source or power sink, impact on power usage, location, and control characteristic. The level and type of control imposed by the PMM involves what type of topology the gateway resides. If a member of stand alone, managed, federation, hierarchical, Federation$_2$ and network groups, its primary focus is local control. As a member of a paired or cluster group, its focus is on the group with all actions are coordinated with other members.

The level of control of all accessible electronic and electro-mechanical components is depended on the characteristics of each component and gateway network topology. Control includes responsiveness, on/off and analog adjustments, resolution, and feedback. The network topology directly involved in determines if the PMM must coordinate its actions with other group members by factoring in remote electronic and electro-mechanical components characteristics.

Power Management Module Process

TABLE 4

Power Profile

| Element | Description |
| --- | --- |
| Power Profile ID | Id of specific hardware/system component |
| Power Type | Power Source - Supplies power to device |
| | Power Sink - Uses power to device |
| Power Usage | How much power used/supplied |
| Power Location | Local - directly accessible |
| | Remote - Accessible via a Local Network System |
| Current Level | If Power Source - current energy output level |
| | If Power Sink - current energy input level |
| Current Status | On/Off |
| Power Priority | 1 - High Priority → x - Lower Priority |

Figure 11:
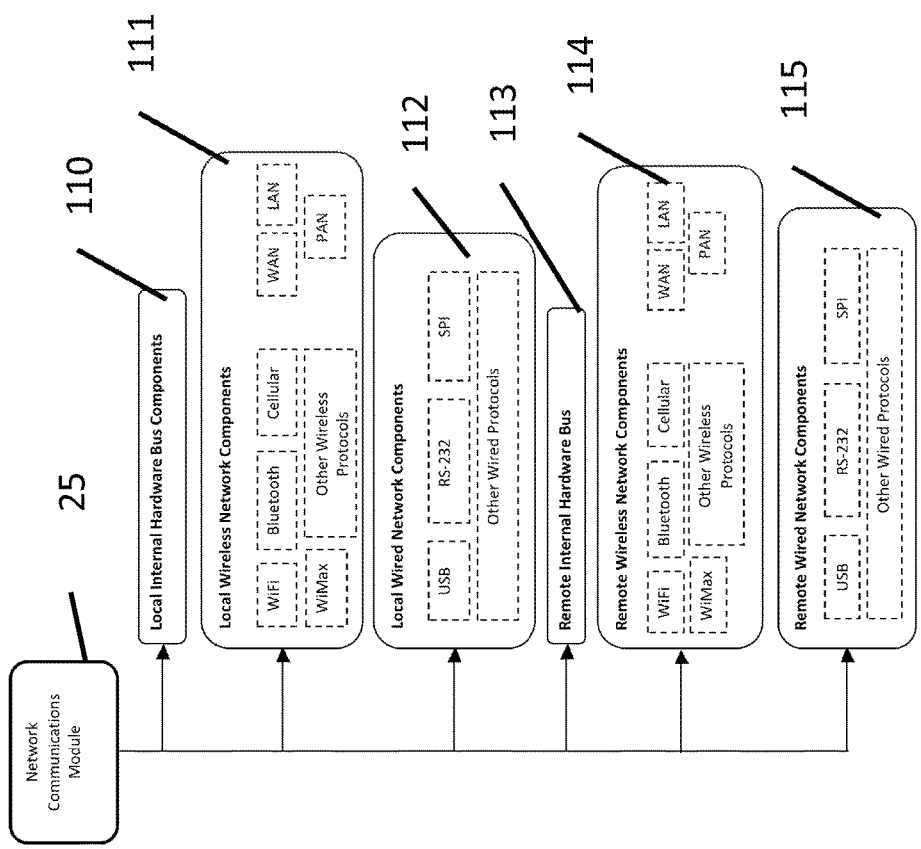
FIG. 11 is a block schematic diagram showing a network communications module according to the invention.
Figure 12:
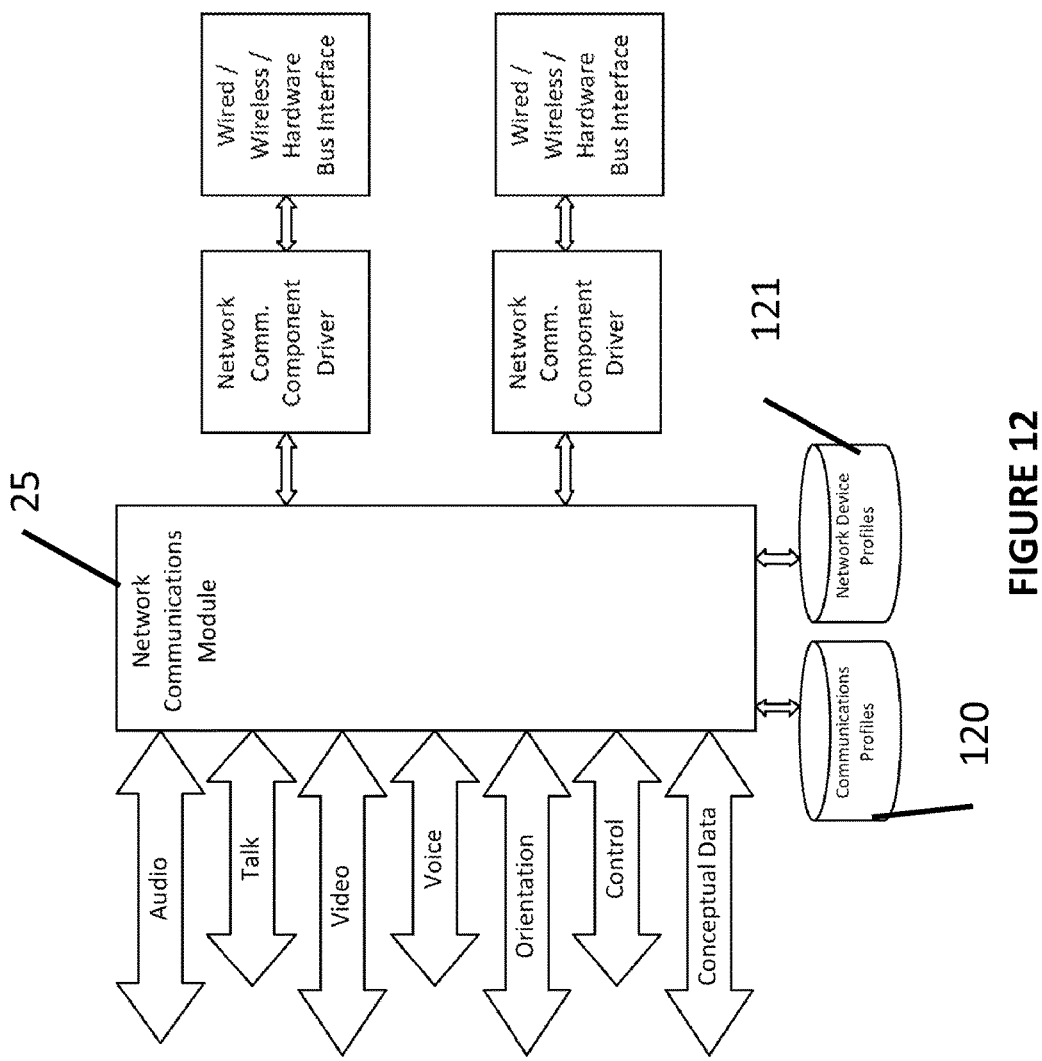
FIG. 12 is a block dataflow diagram showing a network communications module process according to the invention.

Power-Up Sequence for Gateway Power Management Module
  Scan for all local power components physically within the gateway;
  Scan for all local system components power profiles available on any local data storage components;
  Scan for available local network communications components; and
  Wait until the security module has allowed continued processing.
Continuous Power Management Processing Sequence
  Continuously monitor for entering a paired and clustered group topology and transmit using local network communications components stored on data storage components all power and system power component power profiles to other group members;
  Continuously monitor for and process new and updated incoming power profiles from standalone, paired, cluster, managed, federation, hierarchical, Federation$_2$ and network groups using local network communications components or contextual data and storing on data storage components:
    New power profiles comprise all components; and
    Updated power profiles comprise current level and current status;
  Continuously monitor and transmit new and updated incoming power profiles to paired and cluster groups using local network communications components;
  Continuously monitor and transmit on request new and updated power profiles to standalone, managed, federation, hierarchical, Federation$_2$ and network groups using local network communications components;
  Continuously monitor, process and store all active and accessible gateway local power source levels:
    Continuously monitor all power profile power sources levels and store in power profile's current status; and
    Continuously calculate current power source levels and store in power profile's current level factoring in all active power sink power profile's power type, power usage and current levels;
  Continuously calculate all active and accessible gateway local power sink levels:
    Continuously monitor all power profile power sink levels and store in power profile's current status; and
    Continuously calculate current power sink levels and store in power profile's current level;
  Continuously monitor and control all power interface devices using power profile power source and power sink components:
    Continuously monitor all power source components current levels; and
    Continuously control all power sink components current status.
Network Communications Module The network communications module (NCM) 25 (see FIGS. 11 and 12), using a combination of hardware and software, provides controlled and functional routing and optimization of communications for data throughput. By continuously monitoring the availability, type of network connection and format of data to communicate, the NCM sets up, maintains and optimizes communications between the gateway and networked devices and their applications.

When first powering up, the NCM audits for all available local network components, including wired 112, wireless 111, and hardware bus 110 interfaces. Each unique interface has a communications profile 120 maintained and stored by the NCM containing current and maximum speeds, adjustability and manual or automatic control. As new network devices come on line and their network components 113, 114, 115 are made available to the gateway, a communications profile 121 is also maintained and stored by the NCM. See, also, Tables 5 and 6 below.

The NCM is also responsible for transmitting data between the gateway and network devices and applications. By maintaining a network entity profile for each network device, remote gateway module stack module and remote hardware component, the NCM insures duplex-directional communications over multiple networks, multiple components, and multiple applications.

Optimization of communications by the NCM to a network device involves one of two operations: changing the local network component's transmission speed or switching to another local network component. Factors involved in determining what to perform, if any, include: availability of multiple local network component connections to the network device, current transmission speed, network component priority level, data record type, data type and data record priority level. If a transmission speed change is deemed appropriate, the NCM performs a change-in-speed operation with the remote network device prior to transmission of data at the new speed.

TABLE 5

Communications Profile

| Element | Description |
| --- | --- |
| Communications Profile ID | Id of specific hardware/system component |
| Communications Status | On/Off |
| Current transmission/reception rate | Current rate of sending and receiving data |
| Maximum transmission/reception rate | Maximum rate of sending and receiving data |
| Local/Remote | Local - directly accessible<br>Remote - Accessible via a Local Network System |
| Adjustable transmission/reception rate | Yes - Adjustable transmission/reception rate<br>No - Not adjustable |
| Priority Level | 1 - High Priority → x - Lower Priority |
| Control Type | Manual or Automatic |
| Network Type | Standalone, Paired, Clustered, Managed, Federation, Hierarchical and Federation$_2$, Networked |

TABLE 6

Network Entity Profile

| Element | Description |
| --- | --- |
| Network ID | Id of specific network resident module |
| Communications Link | Local Network Communications Component used |
| Maximum transmission/reception rate | Maximum rate of sending and receiving data |
| Type of Network Entity | Module Stack Module<br>Application<br>Remote Network Component |
| Priority Level | 1 - High Priority → x - Lower Priority |
| Control Type | Manual or Automatic |
| Request Type | Power-up/Event |

Figure 13:
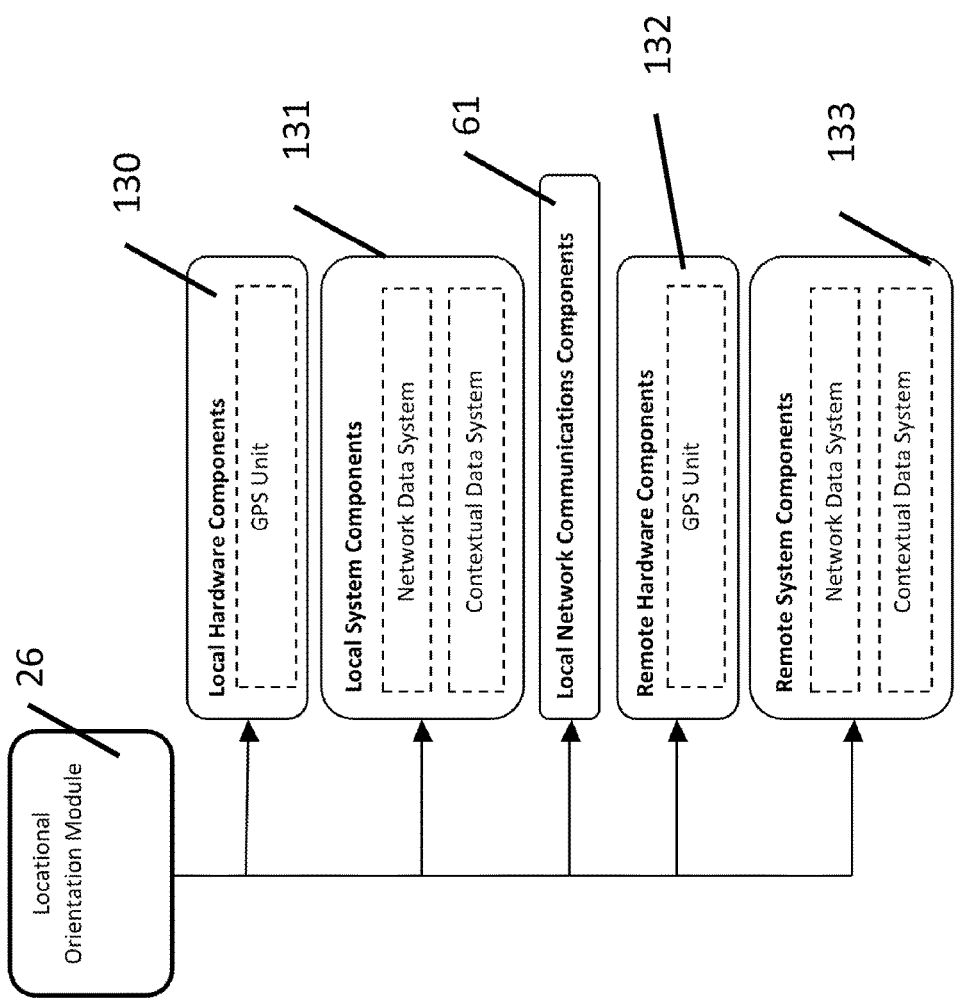
FIG. 13 is a block schematic diagram showing a locational orientation module according to the invention.
Figure 14:
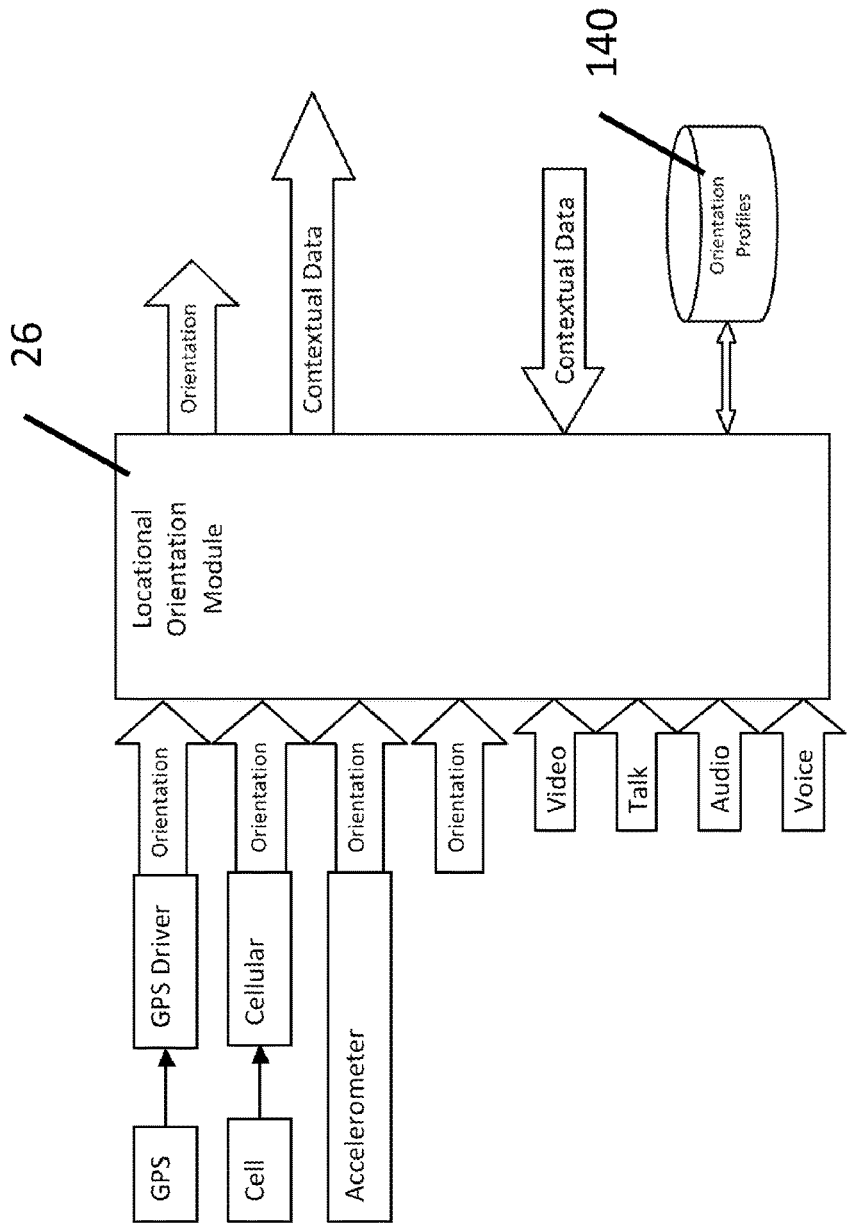
FIG. 14 is a block dataflow diagram showing a locational orientation module process according to the invention.

Network Communications Module Process
Power-Up Sequence for Gateway Network Communications Module
  Scan for all gateway local network communications components comprising of wired, wireless, and hardware bus components;
  Scan for all local network communications components communications profiles available on any local data storage components;
  Scan for all local network communications components network profiles available on any local data storage components;
  Request activation of and network profiles with request type of power-up; and
  Wait until the security module has allowed continued processing.
Continuous Network Communications Processing Sequence
  If no local network components are available, the network communications module turns off;
  Continuously monitor for entering a paired and clustered group topology and transmit using local network communications components stored on data storage components all local communications profiles to other group members;
  Continuously monitor for and process new and updated incoming communications profiles from standalone, paired, cluster, managed, federation, hierarchical, Federation$_2$ and network groups using local network communications components or contextual data and storing on data storage components:
    New communications profiles comprise all components; and
    Updated communications profiles comprise status and transmission/reception rates;
  Continuously monitor and transmit to other paired or clustered group members' local network communications components' current status and transmission/reception rate;
  Continuously monitor for and process upon request new and updated communications profiles from standalone, managed, federation, hierarchical, Federation$_2$ and network groups using local network communications components and storing on data storage components:
    New communications profiles comprise all components; and
    Updated communications profiles comprise status and transmission/reception rates;
  Continuously monitor for and transmit requests by local gateway module stack modules of local gateway module stack module's data to specified network entity devices;
  Continuously monitor for and receive from specified network entity devices data to local gateway module stack modules;
  Continuously synchronize each local network component's transmission/reception rate with other paired or clustered group members' remote network communications components comprising communications profile priority level, batch/stream type, data record level, and manual override;
  Continuous optimization of network communications is performed for each data record transmitted by:
    Changing the local network communications component's current transmission speed:
      Changing transmission speeds requires the network communications module to negotiate with the remote network device to change speeds prior to data transmission;
    Switching to another available local network communications component;
  Factors involved in optimization include: availability of multiple local network component connections to the network device, current transmission speed, network component priority level, data record type, data type and data record priority level.
Locational Orientation Module
  The locational orientation module (LOM) 26 (see FIGS. 13 and 14) using a combination of hardware and software, provides locational data and geo-tagging for the gateway. By continuously monitoring and calculating absolute and relative oriented data, the LOM performs geo-tagging of video, audio, talk, and voice data streams in addition to transmitting it to network devices.
  When first powering up, the LOM audits for all available local hardware 130 and system 131 components. Each unique component has an orientation profile 140 (see FIG. 14 and Table 7, below) maintained and stored by the LOM containing current location, absolute or relative, priority level, and if local or remote. As changes to gateway group participation along with local and remote hardware 132 and system 133 components occur, the orientation profiles are maintained and stored by the LOM.

TABLE 7

Orientation Profile

| Element | Description |
| --- | --- |
| Orientation Profile ID | Id of specific hardware/system component |
| Local/Remote | Local - directly accessible<br>Remote - Accessible via a Local Network System |
| Orientation Status | On/Off |
| Priority Level | 1 - High Priority → x - Lower Priority |
| Orientation Type | Absolute or Relative |
| Current Location | Current location |

Figure 15:
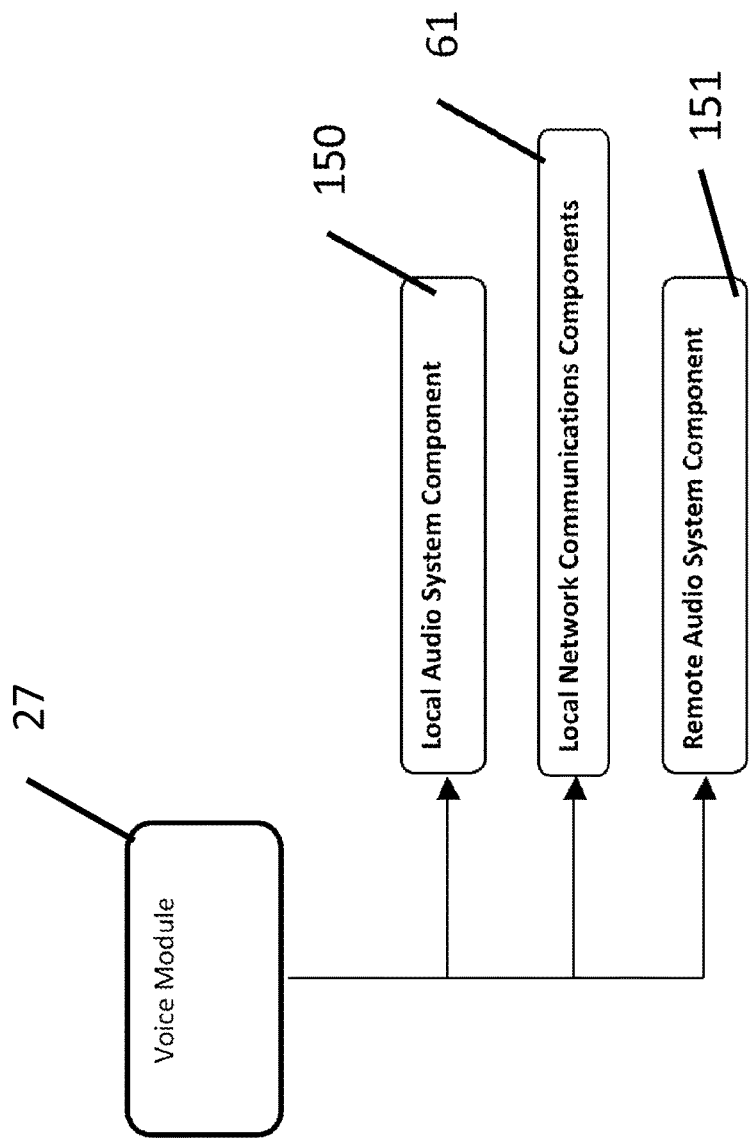
FIG. 15 is a block schematic diagram showing a voice module according to the invention.
Figure 16:
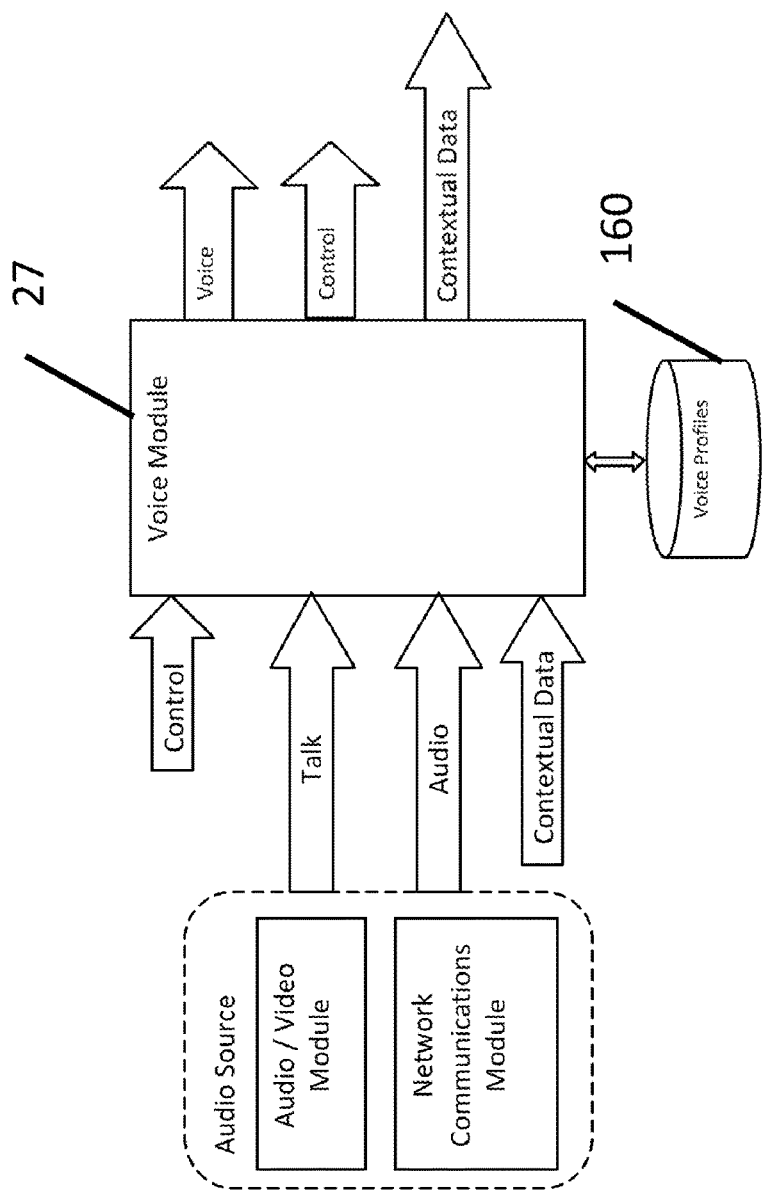
FIG. 16 is a block dataflow diagram showing a voice module process according to the invention.

Locational Orientation Module Process
Power-Up Sequence for Gateway Locational Orientation Module
    Scan for all local hardware and system components physically within the gateway;
    Scan for all local system orientation profiles available on any local data storage components;
    Scan for available local network communications components; and
    Wait until the security module has allowed continued processing.
Continuous Locational Orientation Processing Sequence
    Continuously monitor for entering a paired and clustered group topology and transmit using local network communications components stored on data storage components all local orientation profiles to other group members;
    Continuously monitor for and process new and updated incoming orientation profiles from standalone, paired, cluster, managed, federation, hierarchical, Federation$_2$ and network groups using local network communications components or contextual data and storing on data storage components:
        New orientation profiles comprise all components; and
        Updated orientation profiles comprise current location;
    Continuously monitor for and update the status of all locally stored orientation profiles;
    Continuously monitor, calculate and store data current location to orientation profiles by factoring in local and remote hardware and system components:
        GPS unit;
        Network data system: cellular;
        Contextual data system: accelerometer;
    Continuously monitor and transmit to other paired or clustered group members any changes in local orientation profiles.
Voice Module
    The voice module (VM) 27 (see FIGS. 15 and 16), using a combination of hardware and software, provides voice recognition functionality for the gateway.
    By processing audio and talk data signals, local 150 and remote 151, the VM uses a recognition algorithm to generate voice data and gateway command requests. The VM continuously monitors and processes audio and talk data signals only while in VM monitoring mode.
    By continuously monitoring all audio and talk data signals, the VM evaluates each data signal to a pattern stored within a voice profile 160 (see FIG. 16 and Table 8, below) and, factoring in a weighted value, determines if a match has occurred and reports it.

TABLE 8

Voice Profile

| Element | Description |
| --- | --- |
| Voice Profile ID | Id of person/command |
| Internal Command | Gateway internal command for processing |
| Weighted Value | Weighted valued used in recognition process |
| Voice Pattern | Pattern for voice recognition |

Figure 17:
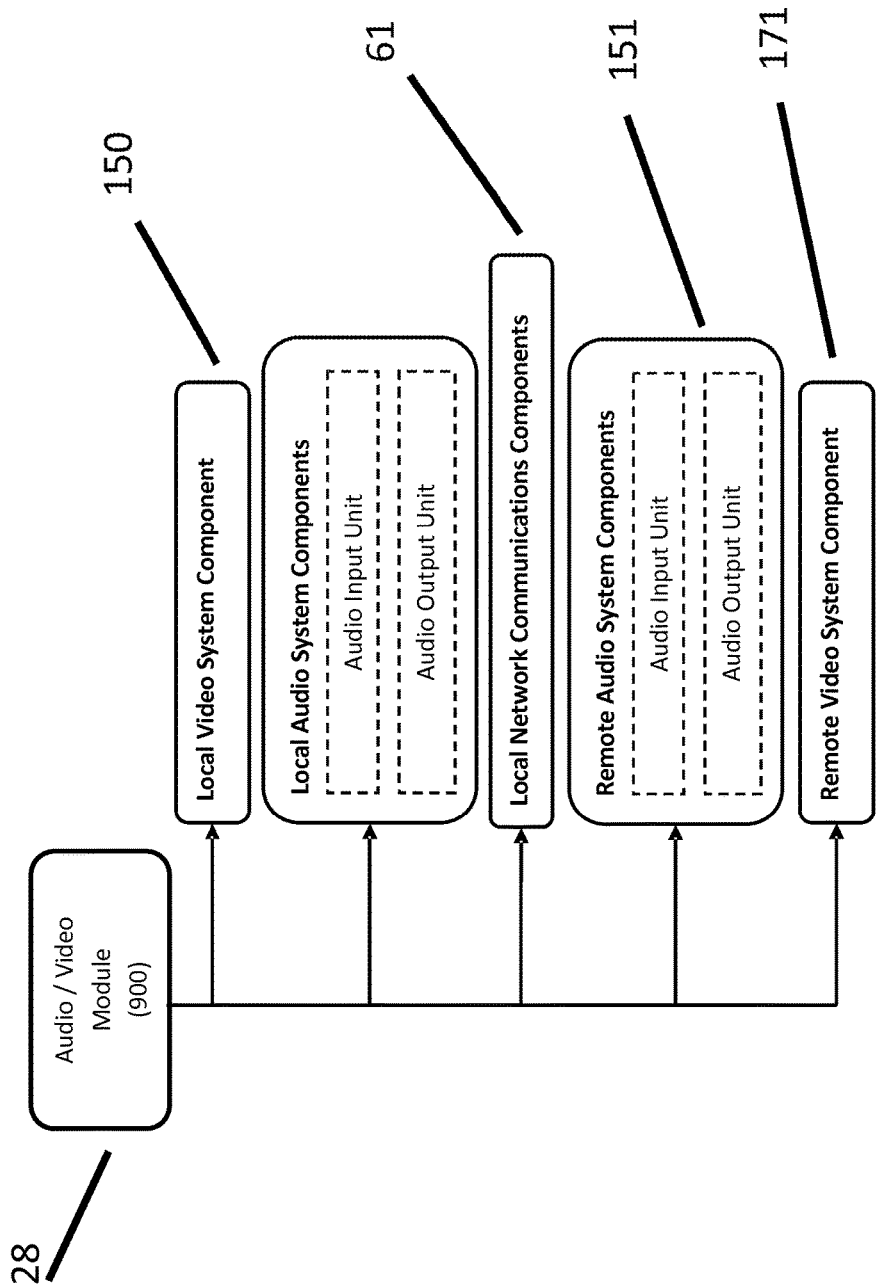
FIG. 17 is a block schematic diagram showing an audio/video module according to the invention.
Figure 18:
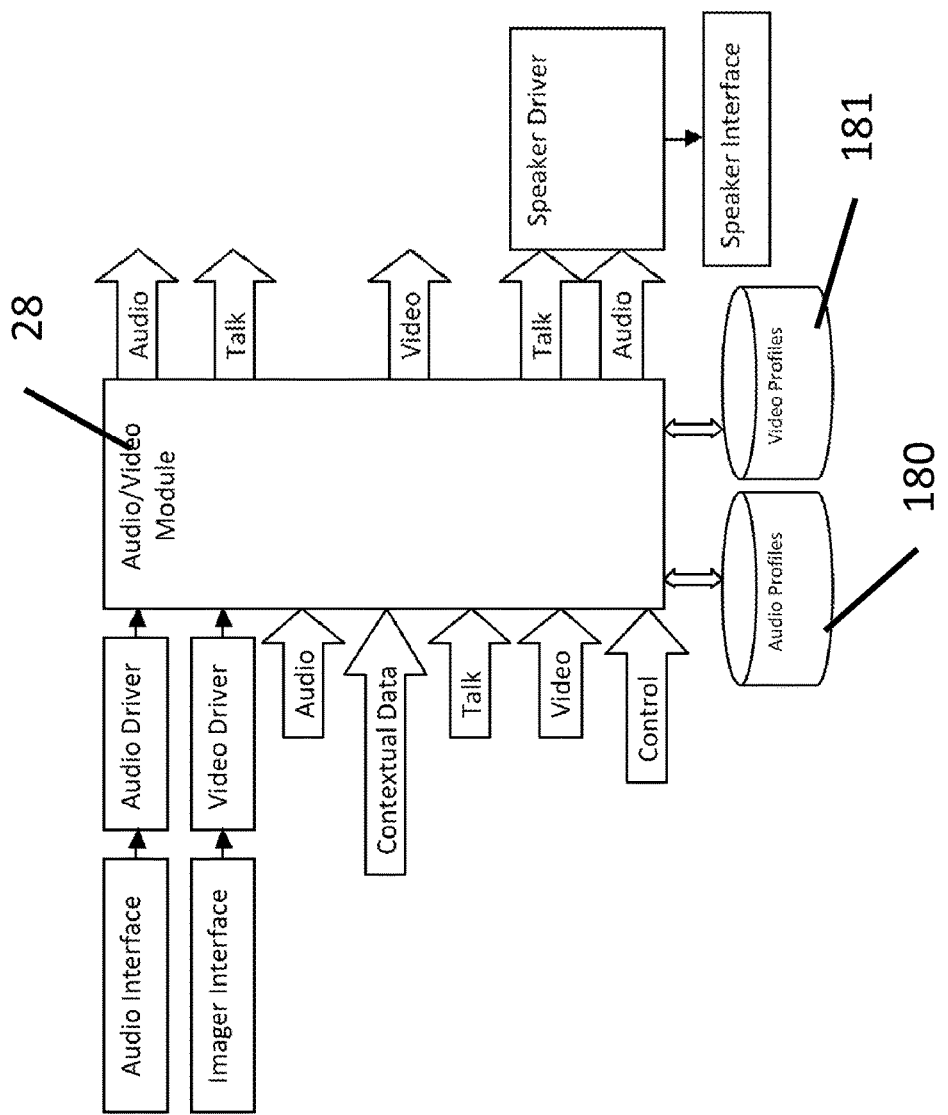
FIG. 18 is a block dataflow diagram showing an audio/video module process according to the invention.

Voice Module Process
Power-Up Sequence for Gateway Voice Module
    Scan for all local system voice profiles available on any local data storage components;
    Scan for available local network communications components; and
    Wait until the security module has allowed continued processing.
Continuous Voice Processing Sequence
    Continuously monitor for entering a paired and clustered group topology and transmit using local network communications components stored on data storage components all local voice profiles to other group members;
    Continuously monitor for and process new and updated incoming voice profiles from standalone, paired, cluster, managed, federation, hierarchical, Federation$_2$ and network groups using local network communications components or contextual data and storing on data storage components:
        New voice profiles comprise all components; and
        Updated voice profiles comprise voice patterns and weighted value;
    Continuously monitor for entering and exiting monitoring mode;
    While in monitoring mode, continuously monitor all incoming audio and talk data signals:
        Local audio and talk data signals using local audio system components and the gateway audio/video module;
        Remote audio and talk data signals use local network communications components and the gateway network communications module;
    While in monitoring mode, continuously process all incoming audio and talk data signals by evaluating the data signal and reporting a match or not:
        Evaluation of a data signal involves using the voice profile's voice pattern and weighted value; and
        Reporting results includes if a match and the voice profile's internal command.
Audio/Video Module
    The audio/video module (AVM) 28 (see FIGS. 17 and 18), using a combination of hardware and software, provides processing of audio and video signals for the gateway. By continuously monitoring any audio and video data signals, the AVM processes and routes them to other local or remote applications or output audio signals to local audio output units.
    When first powering up, the AVM audits for all available local audio 150 and video 170 system components. Each unique component has an audio 180 or video 181 profile (see FIG. 18 and Tables 9 and 10, below) maintained and stored by the AVM including current status, type, priority level, and if local or remote. As changes to gateway group participation along with local and remote audio 151 and video 171 system components occur, the audio and video profiles are maintained and stored by the AVM.

TABLE 9

Audio Profile

| Element | Description |
| --- | --- |
| Audio Profile ID | Id of specific hardware/system component |
| Audio Status | On/Off |
| Audio Type | Speaker or Microphone |
| Priority Level | 1 - High Priority → x - Lower Priority |
| Audio Location | Local or Remote |
| Audio Input Signal Type | Sound or Talk |
| Audio Characteristics | Characteristics necessary in processing signal |

TABLE 10

Video Profile

| Element | Description |
| --- | --- |
| Video Profile ID | Id of specific hardware/system component |
| Video Status | On/Off |
| Video Location | Local or Remote |
| Priority Level | 1 - High Priority → x - Lower Priority |
| Video Characteristics | Characteristics necessary in processing signal |

Figure 19:
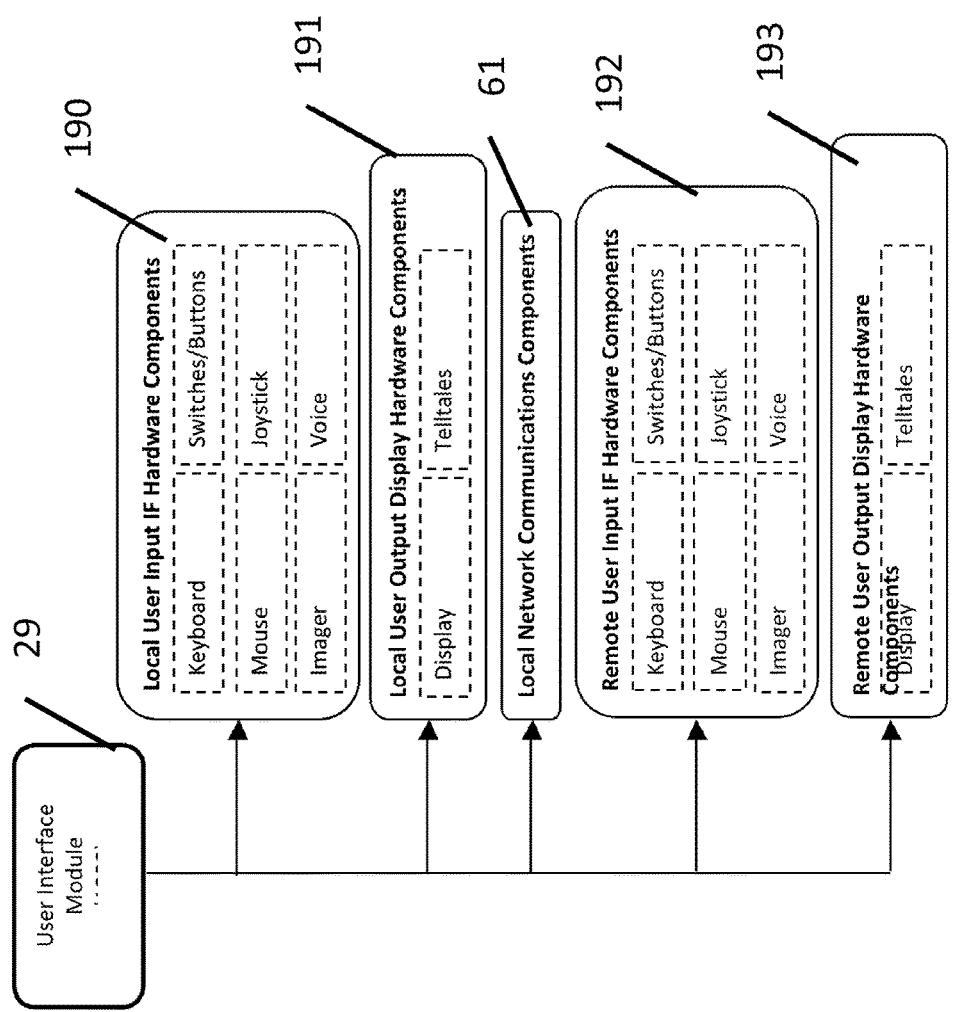
FIG. 19 is a block schematic diagram showing a user interface module according to the invention.
Figure 20:
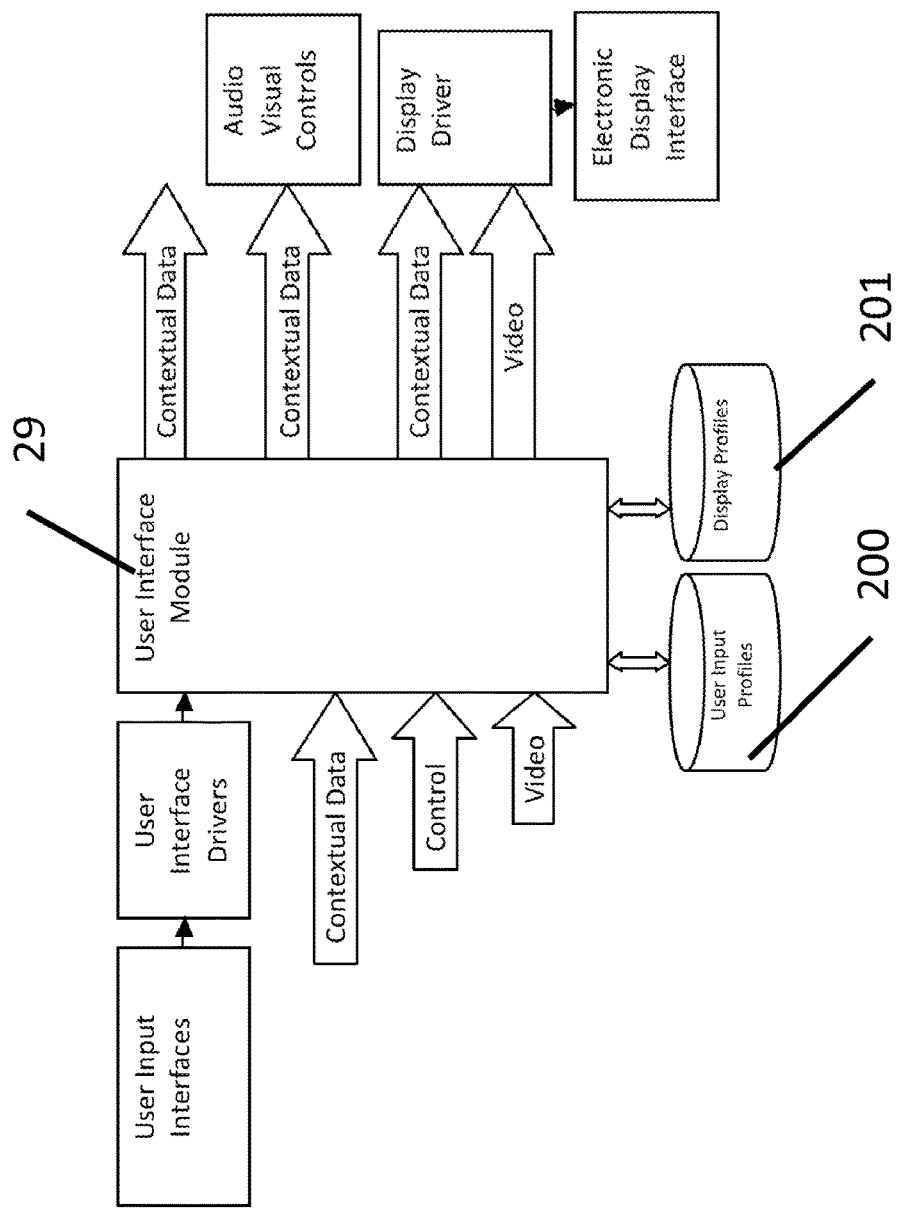
FIG. 20 is a block dataflow diagram showing a user interface module process according to the invention.

Audio/Video Module Process
Power-Up Sequence for Gateway Audio/Video Module
  Scan for all local audio and video system components physically within the gateway;
  Scan for all local audio and video profiles available on any local data storage components;
  Scan for available local network communications components; and
  Wait until the security module has allowed continued processing.
Continuous Audio/Video Processing Sequence
  Continuously monitor for entering a paired and clustered group topology and transmit using local network communications components stored on data storage components all local audio and video profiles to other group members;
  Continuously monitor for and process new and updated incoming audio and video profiles from standalone, paired, cluster, managed, federation, hierarchical, Federation$_2$ and network groups using local network communications components or contextual data and storing on data storage components:
    New audio and video profiles comprise all components; and
    Updated audio and video profiles comprise audio and video status;
  Continuously monitor and transmit to other paired or clustered group members any changes in local audio and video profiles;
  Continuously monitor all incoming data signals:
    Local sound data signals using local audio system components audio input units; and
    Remote audio and talk data signals using local network communications components;
  Continuously process all incoming data signals comprising of audio characteristics, audio input signal type:
    Audio input signal type of sound generates audio data signal; and
    Audio input signal type of talk generate talk data signal;
  Continuously monitor all incoming video data signals:
    Local video data signals using local audio system components; and
    Remote video data signals using local network communications components;
  Continuously process all incoming video data signals by evaluating the data signal using video characteristics;
  Continuously monitor and route when instructed all incoming audio and talk data signals specified local audio system components audio output units.
User Interface Module
  The user interface module (UIM) 29 (see FIGS. 19 and 20), using a combination of hardware and software, provides processing of user interaction for the gateway. By continuously monitoring, coordinating, and processing user input 190 and display 191 hardware components, the UIM gathers and routes contextual and video data necessary for gateway operation.
  When first powering up, the UIM audits for all available local user input and display components. Each unique component has a user input 200 or display 201 profile (see FIG. 20 and Tables 11 and 12, below) maintained and stored by the UIM including current status, type, priority level, and if local or remote. As changes to gateway group participation along with local and remote user input 192 and display 193 hardware components occur, the user input and display profiles are maintained and stored by the UIM.
  The UIM continuously monitors and processes all requests of user-derived data along with any user directed display of information. Coordination of local and remote user input IF and user output display hardware components is driven by incoming data records originating from local gateway stack modules and remote gateways using local network communications components. Any results are returned as contextual data record for processing.

TABLE 11

User Input Profile

| Element | Description |
| --- | --- |
| User IF Profile ID | Id of specific hardware/system component |
| User IF Status | On/Off |
| User IF Type | Keyboard, Joystick, Mouse, Button, Switch, etc. |
| Priority Level | 1 - High Priority → x - Lower Priority |
| User IF Location | Local or Remote |
| User IF Characteristics | Characteristics necessary in processing signal |

TABLE 12

Display Profile

| Element | Description |
| --- | --- |
| Display Profile ID | Id of specific hardware/system component |
| Display Status | On/Off |
| Display Type | Uses Contextual or Video Data |
| Priority Level | 1 - High Priority → x - Lower Priority |
| Display Location | Local or Remote |
| Display Characteristics | Characteristics necessary in processing signal |

User Interface Module Process
Power-Up Sequence for Gateway User Interface Module
  Scan for all local user input and display hardware components physically within the gateway;
  Scan for all local user input and display profiles available on any local data storage components;

Scan for available local network communications components; and

Wait until the security module has allowed continued processing.

Continuous User Interface Processing Sequence

Continuously monitor for entering a paired and clustered group topology and transmit using local network communications components stored on data storage components all local user input and display profiles to other group members;

Continuously monitor for and process new and updated incoming user input and display profiles from standalone, paired, cluster, managed, federation, hierarchical, Federation$_2$ and network groups using local network communications components or contextual data and storing on data storage components:

New user if and display profiles comprise all components; and

Updated user if and display profiles comprise user input and display status;

Continuously monitor and transmit to other paired or clustered group members any changes in local user input and display profiles;

Continuously monitor all incoming input oriented data signals:

Local sound data signals using local user input hardware interface components;

Contextual date from remote user input hardware interface components using local network communications components; and Contextual date from local gateway module stack and remote gateways using local network communications components;

Continuously process all incoming data signals and generate contextual data;

Continuously monitor all incoming local video or contextual data signals; and

Continuously process all incoming local video or contextual data signals and output them to graphical display units, telltales, or other user audible/visual output devices and controls.

Data Management Module

Figure 21:
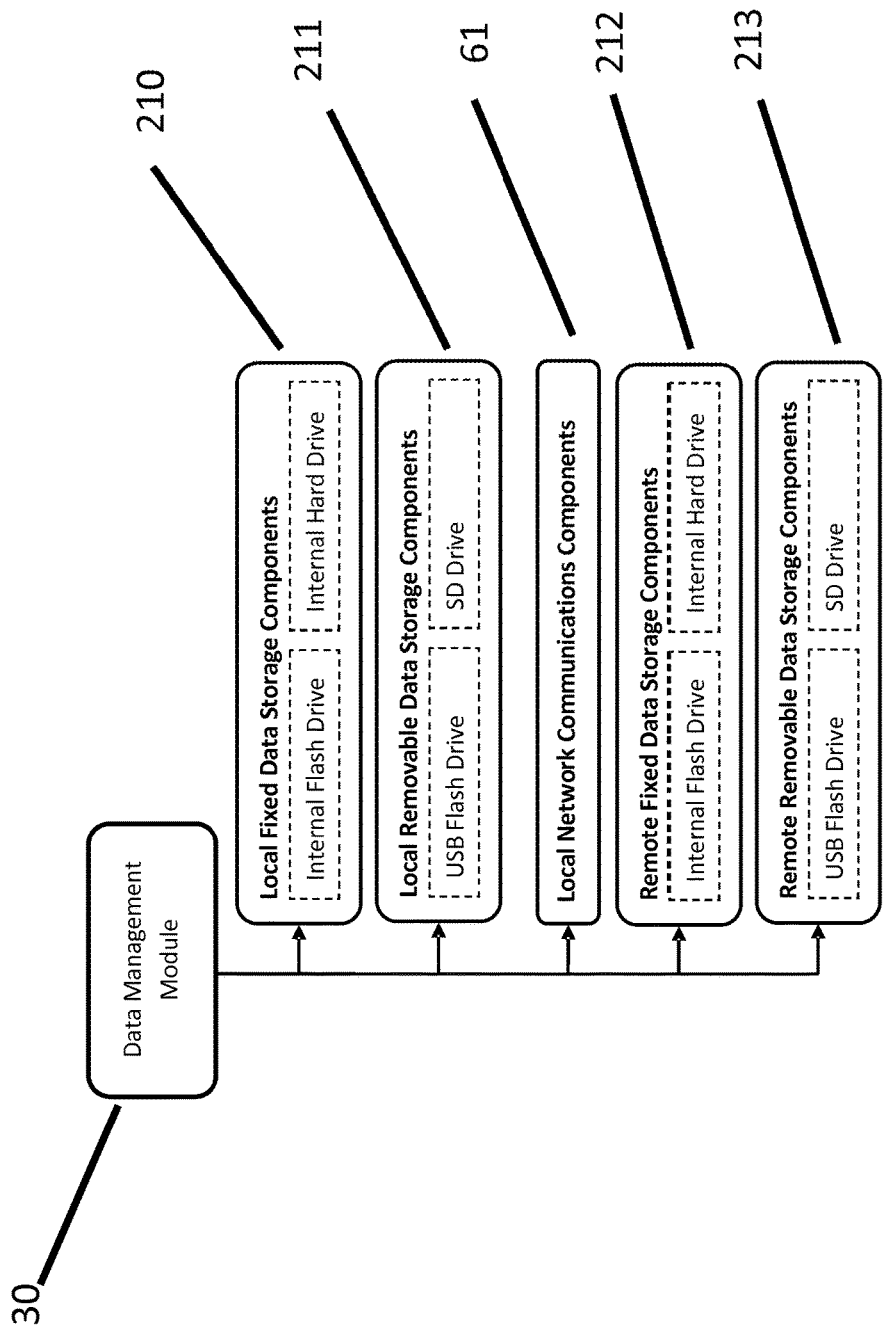
FIG. 21 is a block schematic diagram showing a data management module according to the invention.
Figure 22:
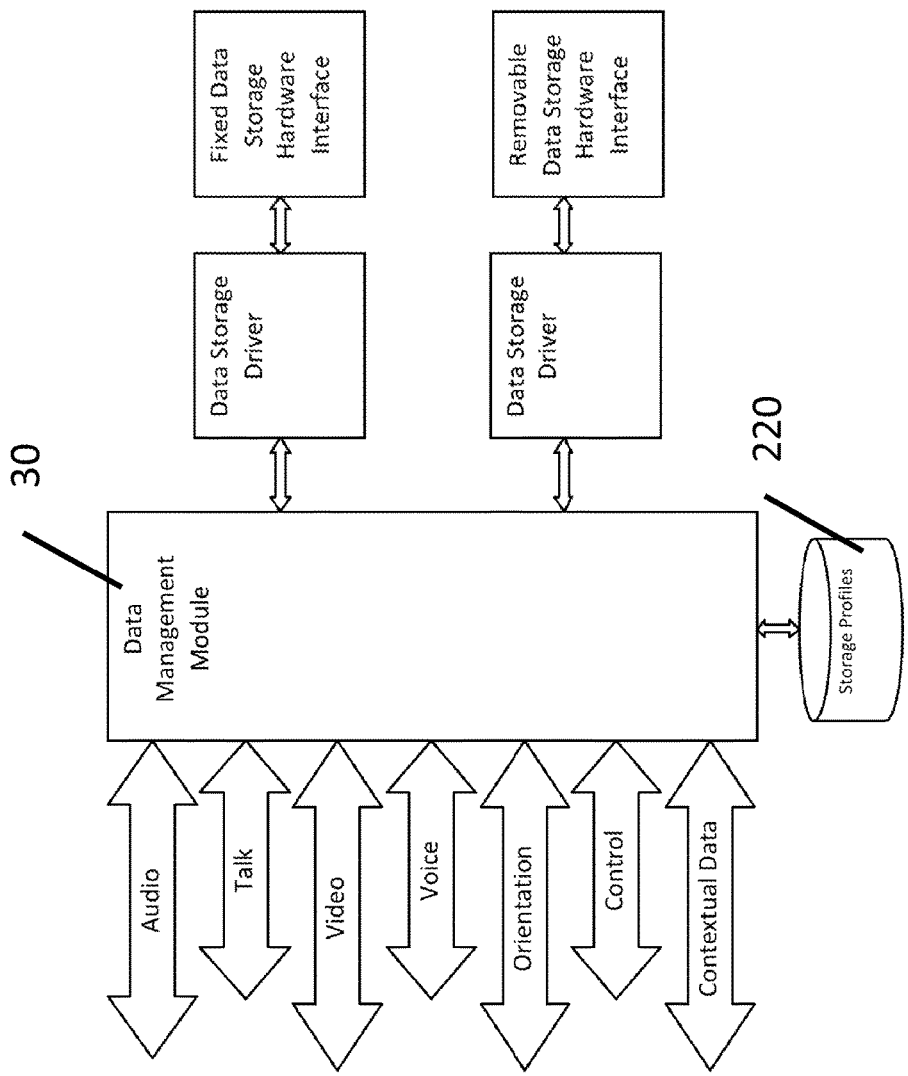
FIG. 22 is a block dataflow diagram showing a data management module description according to the invention.

The data management module (DMM) 30 (see FIGS. 21 and 22), using a combination of hardware and software, provides storage and retrieval of data for the gateway. By continuously monitoring and processing data storage requests, the DMM stores and retrieves from local 210 and remote 212 fixed and local 211 and remote 213 removable data storage components audio, talk, video, voice, orientation, control, and contextual data.

When first powering up, the DMM audits for all available local fixed and removable components. Each unique component has a storage profile 220 (see FIG. 22 and Table 13, below) maintained and stored by the DMM including current status, type, priority level, and if local or remote. As changes to gateway group participation along with local and remote fixed and removable hardware components occur, the storage profiles are maintained and stored by the DMM.

The DMM continuously monitors and processes all requests from the local gateway module stack and remote gateways to store or retrieve data from local and remote fixed and removable hardware components. Storage requests have two types: optimized and manual. Optimized storage requests involve the DMM factoring in storage profile's current storage capacity level, storage status, priority level, local/remote and data record's priority level, data type.

Manual storage requests involve a specified local or remote fixed or removable data storage component.

TABLE 13

Storage Profile

| Element | Description |
|---|---|
| Storage Profile ID | Id of specific hardware/system component |
| Current Storage Capacity Level | Current Storage level |
| Storage Status | On/Off |
| Maximum Storage Capacity | Maximum Storage Capacity |
| Local/Remote | Local - directly accessible<br>Remote - Accessible via a Local Network System |
| Priority Level | 1 - High Priority → x - Lower Priority |
| Control Type | Manual or Automatic |

Data Management Module Process

Power-Up Sequence for Gateway Data Management Module

Scan for all local fixed and removable data storage components physically within the gateway;

Scan for all local storage profiles available on any local data storage components;

Scan for available local network communications components; and

Wait until the security module has allowed continued processing.

Continuous Data Management Processing Sequence

Continuously monitor for entering a paired and clustered group topology and transmit using local network communications components stored on data storage components all local storage profiles to other group members;

Continuously monitor for and process new and updated incoming storage profiles from standalone, paired, cluster, managed, federation, hierarchical, Federation$_2$ and network groups using local network communications components or contextual data and storing on data storage components:

New storage profiles comprise all components; and

Updated storage profiles comprise current storage capacity level and storage status;

Continuously monitor and transmit to other paired or clustered group members any changes in local storage profiles;

Continuously monitor and transmit upon request to other gateway group members using local network communications components any changes in local storage profiles, including current storage capacity level and storage status;

Continuously monitor and calculate all local fixed and removable data storage component's current storage levels and record them in each component's storage profile's current storage level;

Continuously monitor and process requests by local gateway module stack modules and gateway group members using local network communications components to store or retrieve data records from a local storage component:

Store requests include:

Data types of audio, talk, video, voice, orientation, control, and contextual data; and Processing includes manual specification of local or remote data storage component or automatic specification involving optimization including storage profile's current storage capacity level, storage status, priority level, local/remote, and data record's priority level and data type;

Retrieval requests include:

Data types of audio, talk, video, voice, orientation, control, and contextual data; and Processing includes manual specification of local or remote data storage component or automatic specification involving optimization including storage profile's current storage capacity level, storage status, priority level, local/remote, and data record's priority level and data type.

Applications Module

Figure 23:
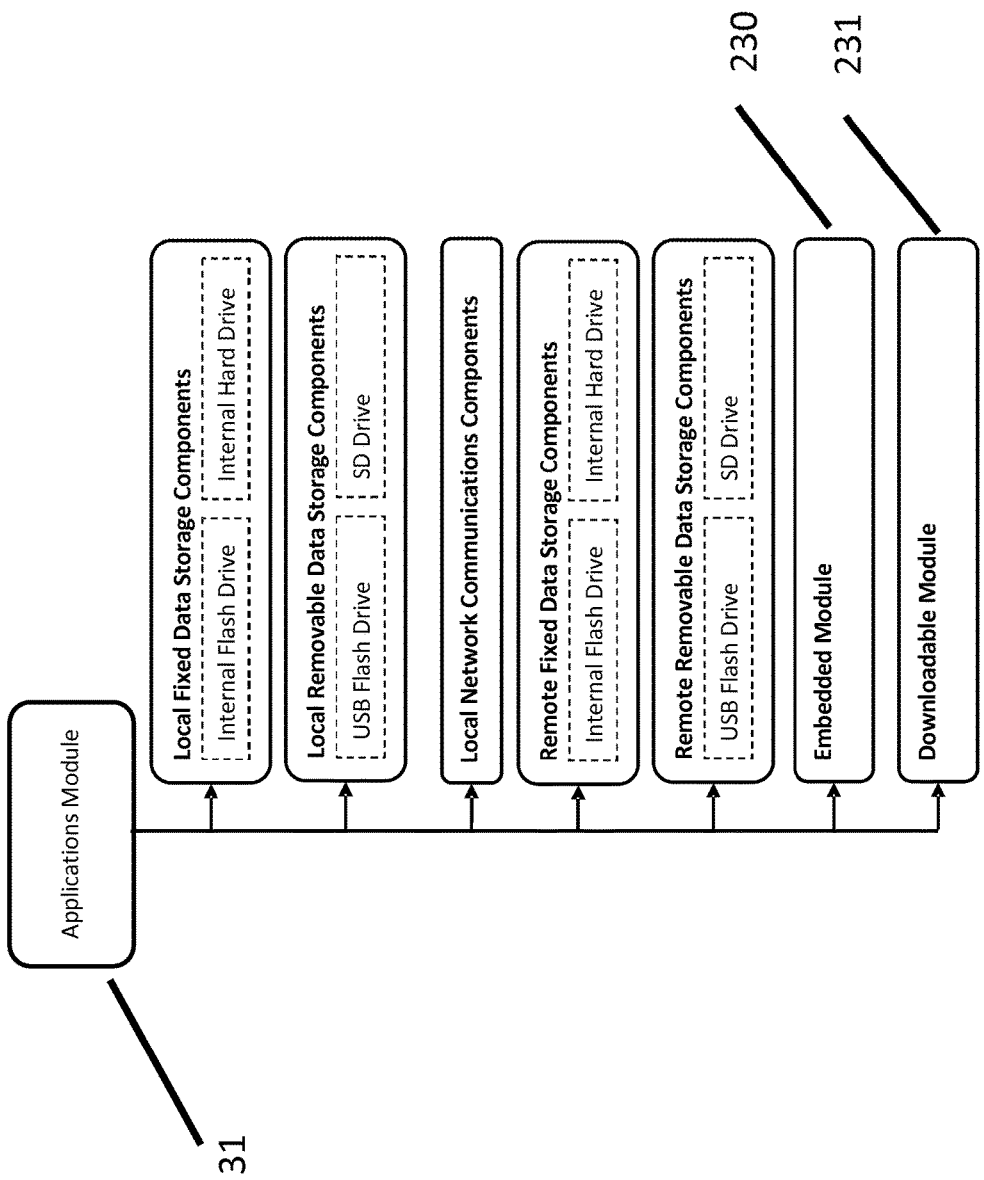
FIG. 23 is a block schematic diagram showing an applications module according to the invention.
Figure 24:
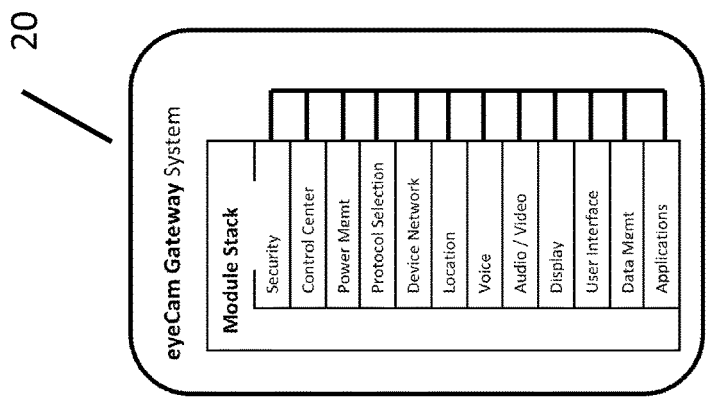
FIG. 24 is a block schematic diagram showing a standalone gateway according to the invention.
Figure 28:
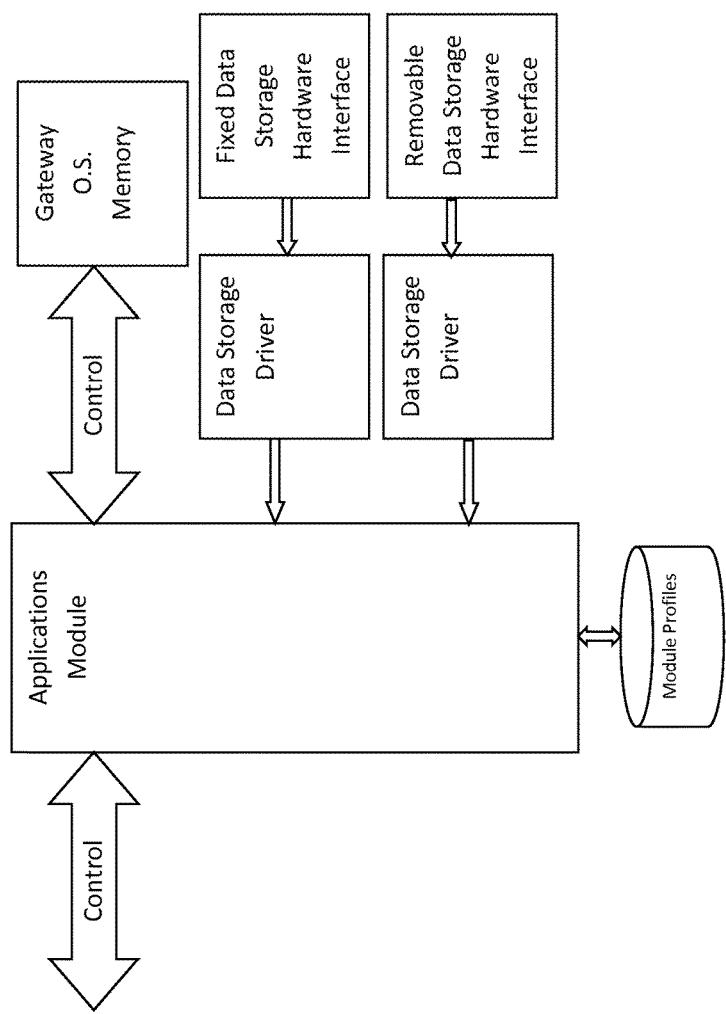
FIG. 28 is a block schematic diagram showing an applications module according to the invention.

The Applications Module (AM) (31) (see FIG. 23), using a combination of hardware memory and software, provides for the maintenance of all Gateway System Stack modules (see FIG. 28). By continuously monitoring and processing requests, the AM dynamically installs, activates and removes applications for execution within the Gateway System architecture (230) (231). Control request, from local or remote sources, can provide:

Executable Gateway Module software

Location of local or remote fixed Data Storage Component of executable module software Module profile information Commands to activate or suspend a module Command to add or remove Gateway Module software TABLE 13a Applications Module Profile
Module Profile

| Element | Description |
| --- | --- |
| Module Profile ID | Id of specific applications module |
| Module Status | On/Off |
| Starting Location | Entry point of application module |
| Local/Remote | Local - directly accessible<br>Remote - Accessible via a Local Network System |
| Priority Level | 1 - Lowest Priority → x -Higher Priority |
| Data Types Used | Voice, Talk, Audio, Video, Locational, Contextual and Control data |
| Activation type | Cyclic, Event, Both |
| Cycle Time | How often to start the module |

Applications Module Process

Power-Up Sequence for GCS Applications Module

Scan for all Local Module Profiles within the GCS

Scan for all Local Storage Profiles available on any Local Data Storage Components.

Scan for available Local Network Communications Components

Wait until the eyeCam Security Module has allowed continued processing

Continuous Applications Processing Sequence

Continuously monitor for activation by CCM

Continuously monitor for local or remote module command requests

Local module command requests via Local User Interface

Remote module command requests over the Network

Process incoming module command requests:

Modify Module Status to active or suspend execution of Gateway Module

Remove Gateway Module's profile on request to delete a module and remove from local Gateway memory Add a profile entry of a Gateway Module Retrieve profile entry and executable software code from a local Network Communications component Retrieve profile entry and executable software code from a local Data Storage component Network Topologies of Gateway Standalone Gateway Characteristics of a Standalone Gateway Embedded Standalone Gateway An embedded standalone version of a gateway device has access to the functions and components shown in Table 14, below.

TABLE 14

Embedded Standalone gateway

| gateway Module | Local Component Control | Network Component Control |
| --- | --- | --- |
| Security | Full | Limited cooperative access |
| Control Center | Full | Limited cooperative access |
| Power Management | Full | Limited cooperative access |
| Communications Management | Full | Limited cooperative access |
| Device Networking | Full | Limited cooperative access |
| Location | Full | Limited cooperative access |
| Voice | Full | Limited cooperative access |
| Audio/Video | Full | Limited cooperative access |
| Display | Full | Limited cooperative access |
| User Interface | Full | Limited cooperative access |
| Data Management | Full | Limited cooperative access |
| Applications | Full | Limited cooperative access |

Downloadable Standalone Gateway

A downloadable standalone version of a gateway device has access to the functions and components shown in Table 15, below.

TABLE 15

Downloadable Standalone gateway

| gateway Module | Local Component Control | Network Component Control |
| --- | --- | --- |
| Security | Limited to local OS access | Limited cooperative access |
| Control Center | Limited to local OS access | Limited cooperative access |
| Power Management | Limited to local OS access | Limited cooperative access |
| Communications Management | Limited to local OS access | Limited cooperative access |
| Device Networking | Limited to local OS access | Limited cooperative access |
| Location | Limited to local OS access | Limited cooperative access |
| Voice | Limited to local OS access | Limited cooperative access |
| Audio/Video | Limited to local OS access | Limited cooperative access |
| Display | Limited to local OS access | Limited cooperative access |
| User Interface | Limited to local OS access | Limited cooperative access |
| Data Management | Limited to local OS access | Limited cooperative access |
| Applications | Limited to local OS access | Limited cooperative access |

Standalone Gateway Description

A standalone gateway performs its functions using its local hardware components fully while requesting access of other network based device components. Functionality is initially defined after a complete audit is performed of local hardware components and active gateway modules. Additional functionality occurs when granted access to network based hardware components and their associated gateway modules.

Example of a Standalone Gateway—Headset

Figure 25:
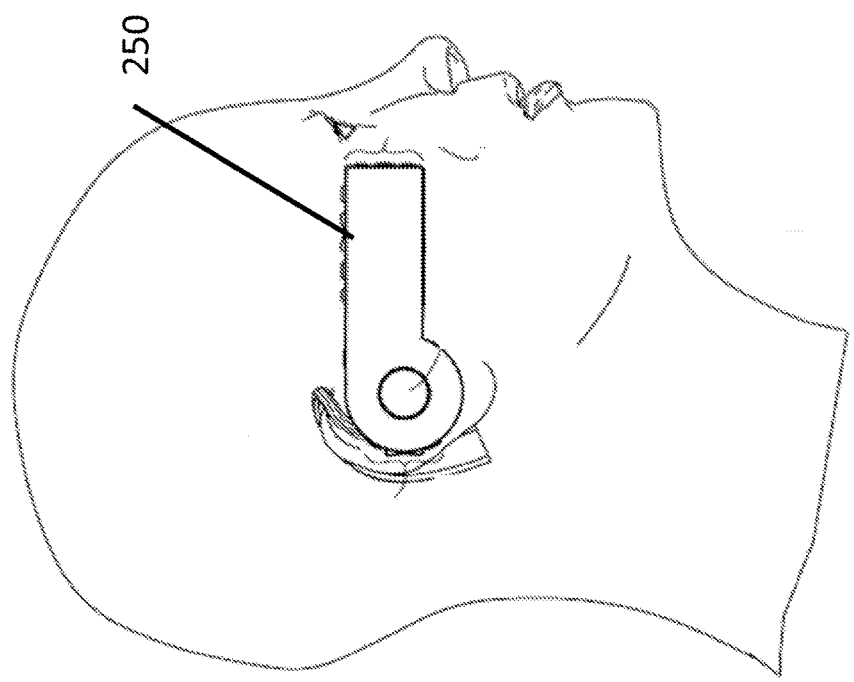
FIG. 25 shows an example of a standalone gateway headset according to the invention.

A gateway headset 250 (see FIG. 25 and U.S. patent application Ser. No. 12/714,693, filed 1 Mar. 2010, which application is incorporated herein in its entirety by this reference thereto), upon turning on power, performs a complete audit of all available hardware components, including network, audio, video, storage and user interface. This audit is performed by the gateway executing all available gateway module power-up sequences and determining both hardware and module availability. For this example, it was preconfigured to only active the headset after user #1 has login using his voice. Once powered up in its login state, the headset waits for user #1 to successfully login. After user #1 has logged in, the gateway indicates to all available modules to migrate to their continuous process sequence Formation of Standalone Gateway Headset On power-up, the gateway headset starts the embedded gateway:

Detect all available local gateway module plug and play profiles:
- Operating system module;
- Security module;
- Control center module;
- Power management module;
- Network communications module;
- Locational orientation module;
- Voice module;
- Audio/video module;
- User interface module; and
- Data management module;

Execute each plug and play profile's power-up sequence to determine all available gateway modules and local hardware components:
- Operating system module;
- Security module security profiles for:
  - User #1;
- Control center module;
- Power management module power profiles for:
  - Pmic;
  - Imager;
  - Audio;
  - Cellular;
  - WiFi;
  - Wimax;
  - Bluetooth
  - GPS;
  - Ethernet IEEE 802.3af;
  - User buttons;
  - User indicators;
  - User display;
  - Accelerometer; and
  - Internal battery;
- Network communications module communications and network profiles for:
  - Communications profiles:
    - Bluetooth;
    - WiFi;
    - Wimax;
    - USB; and
    - Cellular;
  - Network profiles: none;
- Locational orientation module orientation profiles for:
  - GPS unit;
  - Accelerometer; and
  - Cellular baseband;
- Voice module voice profiles for:
  - User #1;
- Audio/video module:
  - Imager (video camera);
  - Dual microphone;
  - Speaker;
- User interface module:
  - UI display;
- Data management module storage profiles; and
- Login application module login profiles for:
  - Power-up sequence.

Execution of Standalone Gateway Headset Login Sequence

- User #1 pushed gateway headset on button;
- The gateway runs through its power-up sequence;
- The gateway powers up only user interface oriented local hardware components:
  - User interface display; and
  - Microphone;
- The gateway executes login application module;
- The gateway sends to the audio/video module control data indicating incoming voice signal;
- The login application module executing the power-up sequence profile:
  - Display login message on user interface display;
- User #1 speaks into microphone component;
- Audio/video module inputs signal and, based on control data, performs noise cancelation on audio signal and creates voice data;
- The gateway sends to the voice module voice data and control data indicating login;
- The voice module compares voice data with user #1 login voice pattern and responds with control data indicating login voice match; and
- The gateway sends control data to all available the gateway modules security clear and to migrate to continuous process sequence.

Computer Implementation

Figure 26:
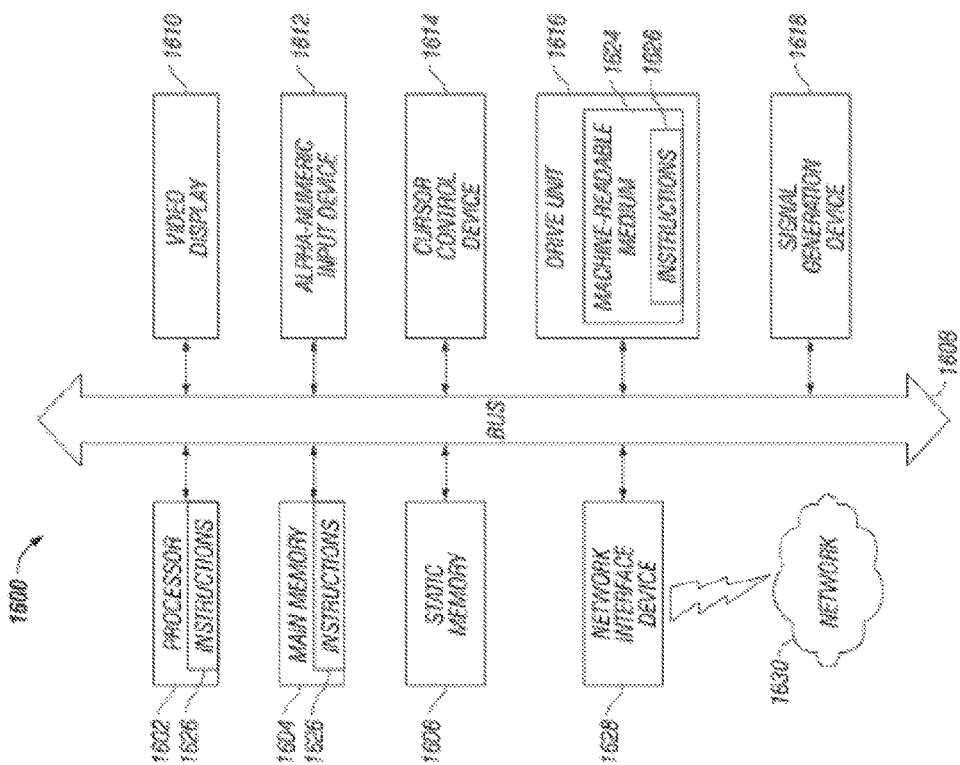
FIG. 26 is a block schematic diagram of a machine in the exemplary form of a computer system within which a set of instructions for causing the machine to perform any one of the herein disclosed methodologies may be executed.

FIG. 26 is a block schematic diagram of a machine in the exemplary form of a computer system 1600 within which a set of instructions for causing the machine to perform any one of the foregoing methodologies may be executed. In alternative embodiments, the machine may comprise or include a network router, a network switch, a network bridge, personal digital assistant (PDA), a cellular telephone, a Web appliance or any machine capable of executing or transmitting a sequence of instructions that specify actions to be taken.

The computer system 1600 includes a processor 1602, a main memory 1604 and a static memory 1606, which communicate with each other via a bus 1608. The computer system 1600 may further include a display unit 1610, for example, a liquid crystal display (LCD) or a cathode ray tube (CRT). The computer system 1600 also includes an alphanumeric input device 1612, for example, a keyboard; a cursor control device 1614, for example, a mouse; a disk drive unit 1616, a signal generation device 1618, for example, a speaker, and a network interface device 1628.

The disk drive unit 1616 includes a machine-readable medium 1624 on which is stored a set of executable instructions, i.e. software, 1626 embodying any one, or all, of the methodologies described herein below. The software 1626 is also shown to reside, completely or at least partially, within the main memory 1604 and/or within the processor 1602. The software 1626 may further be transmitted or received over a network 1630 by means of a network interface device 1628.

In contrast to the system 1600 discussed above, a different embodiment uses logic circuitry instead of computer-executed instructions to implement processing entities. Depending upon the particular requirements of the application in the areas of speed, expense, tooling costs, and the like, this logic may be implemented by constructing an application-specific integrated circuit (ASIC) having thousands of tiny integrated transistors. Such an ASIC may be implemented with complementary metal oxide semiconductor (CMOS), transistor-transistor logic (TTL), very large systems integration (VLSI), or another suitable construction. Other alternatives include a digital signal processing chip (DSP), discrete circuitry (such as resistors, capacitors, diodes, inductors, and transistors), field programmable gate array (FPGA), programmable logic array (PLA), programmable logic device (PLD), and the like.

It is to be understood that embodiments may be used as or to support software programs or software modules executed upon some form of processing core (such as the CPU of a computer) or otherwise implemented or realized upon or within a machine or computer readable medium. A machine-readable medium includes any mechanism for storing or transmitting information in a form readable by a machine, e.g., a computer. For example, a machine readable medium includes read-only memory (ROM); random access memory (RAM); magnetic disk storage media; optical storage media; flash memory devices; electrical, optical, acoustical or other form of propagated signals, for example, carrier waves, infrared signals, digital signals, etc.; or any other type of media suitable for storing or transmitting information.

Although the invention is described herein with reference to the preferred embodiment, one skilled in the art will readily appreciate that other applications may be substituted for those set forth herein without departing from the spirit and scope of the present invention. Accordingly, the invention should only be limited by the Claims included below.

The invention claimed is:

1. A computer implemented communications gateway, comprising:
 a storage medium having stored therein program instructions which comprise a multitasking operating system which is partitioned into a module core layer, a module OS interface layer, and an operating environment;
 wherein said multitasking operating system comprises a gateway control system, said gateway control system comprising an organized data and network management platform and a dynamic source routing system, said dynamic source routing system comprising attributes from a plurality of routing methods;
 wherein said module core layer is configured to perform high level, coordinated functionality and comprises core gateway software that is compiled and linked only;
 wherein said module OS interface layer is configured to directly allow a module applications layer within said operating environment to map a module core layer I/O with a given device's resident operating system;
 wherein said module OS interface layer is configured to be customized, compiled, and linked with said module core layer to a plurality of sequentially, autonomous modules, each module being configured to communicate with hardware and other gateway modules; and
 wherein said gateway modules collectively comprise a gateway stack (GS).

2. The gateway of claim 1, wherein said gateway control system further comprises:
 a plurality of gateway stacks of two or more gateway devices.

3. The gateway of claim 2, wherein said two or more gateway devices are configured to recognize each other based on security settings.

4. The gateway of claim 2, wherein each gateway device is configured to join into a unified group that combines the modules of both devices and in which each device is configured to adopt the capabilities of the other device and then generate a new priority setting for both networked devices.

5. The gateway of claim 2, wherein the gateway stacks (GS) of two or more gateway devices are configured to recognize each other and join a collective gateway module stack.

6. The gateway of claim 5, wherein the gateway module stack is configured to coordinate the optimum group or network configuration and/or coordinate cluster of groups and network configurations based on the level of access and security settings of each networked device and/or the optimized network configuration for an one or any combination of power, bandwidth, available protocols, location, and other routing parameters.

7. The gateway of claim 2, wherein at least some of said plurality of gateway stacks are configured in a group as a unified module stack and wherein each gateway device is configured to authorize a complete module stack and related system access to another device or group of devices.

8. The gateway of claim 7, wherein the unified module stack is configured to seek out any one or any combination of the most efficient distribution of system priorities, tasks, and responsibilities, collectively for the entire group of devices.

9. The gateway of claim 2, wherein individual module stacks in each device are configured to set to authorize, and wherein the device is configured to acknowledge and adopt the related components and systems of the other networked devices and groups them into a networked component set.

10. The gateway of claim 2, wherein at least some of said plurality of gateway devices comprises a federated network of gateway devices in which all devices are configured to maintain their autonomy.

11. The gateway of claim 10, wherein said devices of said federated network of gateway devices are configured to serve as a wireless router or bridge node supporting in any one or any combination of optimized transfer of data and network channeling, device coordination, and optimized communications.

12. The gateway of claim 11, wherein said devices of said federated network of gateway devices are configured to have no access to networked data or devices and no remote systems control because all transferred data is channeled to an authorized receiving device and is not capable of being accessed or received by any authorized receiving device with optional key or data encryption available.

13. The gateway of claim 2, wherein said gateway control system has a hierarchal managed network configuration comprising a server based managed gateway network, and wherein at least some of said plurality of devices comprise issued gateway enabled wireless devices configured and authorized as managed devices.

14. The gateway of claim 13, wherein each of said managed devices is configured to be either permanently assigned to a specific user or temporarily assigned to a specific user or group of users with any one or any combination of all user, device, data, and network authorization set up via a network-based hierarchy.

15. The gateway of claim 1, further comprising:
a virtual machine monitor that is configured to run in an embedded system as either a downloadable program or as a networked application.

16. The gateway of claim 1, wherein said routing protocols comprise routing protocols for Mobile ad hoc and Mesh Networking (MANET).

17. The gateway of claim 16, wherein said routing protocols comprise any one or any combination of reactive and proactive (Hybrid) Routing, Hierarchical Routing, Multi-point Relay, Temporally-ordered Routing Algorithm (TORA), Geographical Routing (Geocasting), Power-aware and Multicast Routing, Dynamic Source Routing (DSR), and Concurrent Multi-path Routing (CMR) into one platform.

18. The gateway of claim 1, wherein said gateway control system is configured such that data collected and managed by each module can be channelled directly from a source gateway device to one or more receiving devices.

19. The gateway of claim 18, wherein said gateway control system is configured to stream and/or transfer said data via a virtual machine monitor interface link configured between one or more networked gateway devices.

20. The gateway of claim 19, wherein said gateway control system is configured to channel voice, contextual, and audio-video data either as a collective gateway stack over a single wired or wireless network, or broadcasted independently via a unique module data stream over one or more available networks.

21. The gateway of claim 19, wherein said gateway devices are configured using different networks to communicate by mesh networking with one or more bridge nodes (gateway devices operating as routers), said bridge nodes being configured to then relay the data stream securely to and from one or more networked devices.

* * * * *